United States Patent
Zhou et al.

(10) Patent No.: US 9,894,561 B2
(45) Date of Patent: Feb. 13, 2018

(54) SIGNALING SOFT TIME DIVISION MULTIPLEXING IN ENHANCED DISTRIBUTED CHANNEL ACCESS

(71) Applicant: QUALCOMM Incorporated, San Diego, CA (US)

(72) Inventors: Yan Zhou, San Diego, CA (US); Simone Merlin, San Diego, CA (US); Gwendolyn Denise Barriac, Encinitas, CA (US); Bin Tian, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 306 days.

(21) Appl. No.: 14/719,000

(22) Filed: May 21, 2015

(65) Prior Publication Data
US 2015/0341130 A1    Nov. 26, 2015

Related U.S. Application Data

(60) Provisional application No. 62/002,456, filed on May 23, 2014.

(51) Int. Cl.
*H04W 28/18* (2009.01)
*H04W 28/26* (2009.01)
(Continued)

(52) U.S. Cl.
CPC ........... *H04W 28/18* (2013.01); *H04J 3/1694* (2013.01); *H04L 5/0053* (2013.01);
(Continued)

(58) Field of Classification Search
CPC ...... H04L 12/56; H04L 29/0653; H04L 45/74; H04L 49/3009; H04L 49/309;
(Continued)

(56) References Cited

U.S. PATENT DOCUMENTS 8,125,969 B2   2/2012   Ji et al.
8,498,275 B2   7/2013   Wentink
(Continued)

OTHER PUBLICATIONS

IEEE, "Part 11: Wireless LAN Medium Access Control (MAC) and Physical Layer (PHY) Specifications," IEEE Standard for Information technology—Telecommunications and information exchange between systems, Local and metropolitan area networks—Specific requirements, IEEE Std. 802.11™-2012 (Revision of IEEE Std. 802.11-2007), Mar. 26, 2012, 2793 pgs., the Institute of Electrical and Electronics Engineers, Inc., New York, NY.
(Continued)

*Primary Examiner* — Ashley Shivers
(74) *Attorney, Agent, or Firm* — Holland & Hart LLP

(57) ABSTRACT

Methods, systems, and devices are described for signaling soft time division multiplexing (TDM) assignment information in an enhanced distributed channel access (EDCA) operation. The soft TDM assignment may be sent to one or more nodes of a group of nodes to communicate with indicated priority access parameters during at least one of a plurality of time slots. The soft TDM assignment may also convey one or more backoff operation rules to at least one of the one or more nodes. Further, primary and secondary non-concurrent nodes may be identified and a signal sent to the secondary node for it to communicate, at a different priority than the primary node, during at least one of a plurality of non-concurrent time slots the primary node is communicating during.

49 Claims, 13 Drawing Sheets

(51) Int. Cl.
*H04L 29/06* (2006.01)
*H04J 3/16* (2006.01)
*H04L 12/26* (2006.01)
*H04W 72/04* (2009.01)
*H04W 72/10* (2009.01)
*H04W 74/00* (2009.01)
*H04L 5/00* (2006.01)

(52) U.S. Cl.
CPC ...... *H04L 29/06537* (2013.01); *H04L 43/067* (2013.01); *H04W 28/26* (2013.01); *H04W 72/0446* (2013.01); *H04L 5/0007* (2013.01); *H04W 72/10* (2013.01); *H04W 74/006* (2013.01)

(58) Field of Classification Search
CPC ...... H04J 3/0647; H04J 3/0652; H04J 3/0691; H04J 3/0694; H04J 3/1694
See application file for complete search history.

(56) References Cited

U.S. PATENT DOCUMENTS

| | | |
|---|---|---|
| 8,509,210 B2 | 8/2013 | Kapadia et al. |
| 2006/0050742 A1* | 3/2006 | Grandhi ............ H04W 74/0816 370/506 |
| 2008/0095124 A1 | 4/2008 | Ramos et al. |
| 2011/0128849 A1 | 6/2011 | Guo |
| 2013/0070734 A1 | 3/2013 | Hwang et al. |
| 2013/0279427 A1 | 10/2013 | Wentink et al. |
| 2016/0073429 A1* | 3/2016 | Oteri ................ H04W 74/0816 370/338 |

OTHER PUBLICATIONS

ISA/EPO, Partial International Search Report of the International Searching Authority, Int'l App. No. PCT/US2015/032153, Aug. 5, 2015, European Patent Office, Rijswijk, NL, 6 pgs.

ISA/EPO, International Search Report and Written Opinion of the International Searching Authority, Int'l App. No. PCT/US2015/032153, dated Nov. 11, 2015, European Patent Office, Rijswijk, NL, 24 pgs.

"European Search Report—EP17180082—Search Authority—The Hague—dated Oct. 11, 2017".

* cited by examiner

| Type | Duration | Start Time | Periodicity | # of Periods | Mapping Set – a | ... | Mapping Set – n |
|---|---|---|---|---|---|---|---|
| 505 | 510 | 515 | 520 | 525 | 530-a | | 530-n |

| Type | Duration | Start Time | Periodicity | # of Periods | Primary/ Secondary EDCA Parameters | Primary Node Group 1 | ... | Primary Node Group n |
|---|---|---|---|---|---|---|---|---|
| 505-a | 510-a | 515-a | 520-a | 525-a | 535 | 540-a | | 540-n |

SIGNALING SOFT TIME DIVISION MULTIPLEXING IN ENHANCED DISTRIBUTED CHANNEL ACCESS

CROSS REFERENCES

The present Application for Patent claims priority to U.S. Provisional Patent Application No. 62/002,456 by Zhou et al., entitled "Signaling Soft Time Division Multiplexing in Enhanced Distributed Channel Access," filed May 23, 2014, assigned to the assignee hereof, and expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless communications network may include a number of network devices such as access points (APs) that can support communication for a number of wireless devices. A wireless device may communicate with a network device bi-directionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP.

In WLANs, there may be cases in which multiple STAs are in communication with a particular AP. Access to the wireless medium may be controlled through a medium access control (MAC), which may allow different STAs to access a wireless channel according to enhanced distributed channel access (EDCA) rules. According to EDCA rules, STAs may be separated into groups with a transmit opportunity (TXOP), which is a duration of time slot during which STAs within the group are allowed to continually access the medium without backoff. In some deployments, a wireless network may have multiple different access priorities for each group and, within each group, priorities according to an access class of data that is transmitted using the wireless channel, each of which may have a different TXOP limit.

In order to enhance utilization of each time slot (or TXOP), EDCA based soft time division multiplexing (TDM) may provide for STAs within a group of STAs to access the wireless medium during a particular time slot. The STAs within the group may be permitted to access the wireless medium during the time slot at a priority lower than STAs in a second group. Alternatively, the STAs within the group may be permitted to access the wireless medium during the time slot at a priority higher than STAs in the second group. There is a need, however, to signal the appropriate operational parameters for each time slot, e.g., STA group identification information, EDCA parameters for each STA group, time slot information, etc., to the STAs within the group to ensure successful access during the appropriate time slot.

SUMMARY

Various methods, systems, devices, and apparatuses are described for soft time division multiplexing (TDM) in enhanced distributed channel access (EDCA). Broadly, signaling and backoff rules are described for general soft TDM operations as well as soft TDM signaling for non-concurrent users. In some aspects, general soft TDM signaling may include sending EDCA parameters for each station (STA) group in a reserved time slot and EDCA parameters for STAs communicating outside a soft TDM time slot. The signaling may include one or more soft TDM assignment fields sent to a group of STAs (or nodes) to communicate during one or more time slots with different priorities. The soft TDM assignment field may include connection information that STAs from the group utilize to communicate during the time slots. One (or more) of the STAs in a group of STAs may include a backoff timer associated with backoff operations at a boundary of the time slot. The soft TDM assignment field may also include information indicative of backoff operation rules for the STAs to use for backoff operations, e.g., pause/restart the backoff timer per time slot, reset the backoff timer for each time slot, etc.

Further, the described features may provide for soft TDM signaling for non-concurrent users. Primary STAs (or nodes) may be identified to communicate during a non-concurrent time slot. Secondary STAs (or nodes) may also be identified to communicate during the non-concurrent time slot. In some aspects, a signal may be sent to the secondary nodes that conveys connection information for the secondary node to communicate during the non-concurrent time slot. The connection information may permit the secondary node to communicate during the non-concurrent time slot at a different priority level than the primary node to ensure full utilization of the non-concurrent time slot.

In a first set of illustrative embodiments, a method for wireless communication is described. The method may include: sending a signal comprising one or more soft time division multiplexing (TDM) assignment fields to a first group of nodes, wherein at least one of the soft TDM assignment fields is configured to convey connection information to the first group of nodes to communicate during at least one time slot at a first priority level that is different from a second priority level of a second group of nodes communicating during the at least one time slot; and communicating with at least one node from the first group of nodes during the at least one time slot at the first priority level.

In some aspects, the connection information may include one or more of identification data for each group of nodes communicating during the at least one time slot, a set of enhanced distributed channel access parameters for the groups of nodes communicating during the at least one time slot, and a time slot parameter identifying the at least one time slot. The identification data may include at least one of an identification code associated with one or more nodes in one or more groups of nodes, a range of identification codes associated with one or more nodes in one or more groups of nodes, and an index of predefined identification codes for one or more groups of nodes. The set of enhanced distributed channel access parameters may include one or more of a minimum contention window size, a maximum contention window size, an arbitration inter-frame space number, and a transmit opportunity for each group of nodes. The time slot parameter may include a start time and a duration field for the first time slot or a start time and an end time for the at least one time slot.

In some aspects, the at least one of the soft TDM assignment fields may include one or more of information identifying operating channels of an enhanced distributed channel access, default enhanced distributed channel access parameters to be used by unspecified nodes during the at least one time slot, enhanced distributed channel access parameters to be used per group of nodes during a second time slot that is different from the at least one time slot, and default enhanced distributed channel access parameters to be used by nodes outside of any specified time slot.

In some aspects, the at least one of the soft TDM assignment fields may be sent in at least one of a beacon, a probe request message, a probe response message, an association request message, or an association response message. The at least one time slot may include a plurality of time slots that each repeat on a recurring schedule and the at least one of the soft TDM assignment fields may comprise periodicity information.

In some aspects, the at least one of the soft TDM assignment field may convey the connection information associated with each time slot in every period to at least one of a plurality of groups of nodes scheduled to communicate during that time slot in every period. The signal may include a common enhanced distributed channel access parameters for a primary group of nodes and a secondary group of nodes to use during each time slot in every period. Each soft TDM assignment field may identify tnodes to use the common enhanced distributed channel access parameters as the primary group of nodes and nodes to use the common enhanced distributed channel access parameters as the secondary group of nodes.

In some aspects, at least one node in each group of nodes may include a backoff timer associated with backoff operations performed at a boundary of the at least one time slot. The signal may include at least one backoff operations rule that indicates to the at least one node in each group of nodes to: update the backoff timer based at least in part on the connection information in the at least one of the soft TDM assignment fields; and reset the backoff timer at the beginning of at least the first time slot.

In some aspects, at least one node communicating on the enhanced distributed channel access may include a plurality of backoff timers associated with backoff operations performed at a boundary of a time slot during which the at least one node is communicating, each backoff timer associated with a particular time slot in a recurring schedule. The signal may include at least one backoff operations rule that indicates to the at least one node to: pause the associated backoff timer at the end of each time slot in the recurring schedule during which the node is communicating; and restart the associated backoff timer at the beginning of a next subsequently occurring time slot in the recurring schedule during which the node is communicating.

In some aspects, at least one node communicating on the enhanced distributed channel access may include a primary backoff timer associated with backoff operations performed at a boundary of primary time slot during which the at least one node is communicating and a secondary backoff timer associated with backoff operations performed at a boundary of a secondary time slot during which the at least one node is communicating. The signal may include at least one backoff operations rule that indicates to the at least one node in each group of nodes to: pause the primary backoff timer at the end of the primary time slot during which the at least one node is communicating; and restart the primary backoff timer at the beginning of a next subsequently occurring primary time slot during which the at least one node is communicating. The signal may include at least one backoff operations rule that indicates to the at least one node in each group of nodes to: reset the secondary backoff timer at the beginning of each recurring secondary time slot during which the at least one node is communicating.

In a second set of illustrative embodiments, an apparatus for wireless communication is described. The apparatus may include: a soft TDM assignment component configured to send a signal comprising one or more soft TDM assignment fields to a first group of nodes, wherein at least one of the soft TDM assignment fields is configured to convey connection information to the first group of nodes to communicate during at least one time slot at a first priority level that is different from a second priority level of a second group of nodes communicating during the at least one time slot; and the soft TDM assignment component further configured to communicate with at least one node from the first group of nodes during the at least one time slot at the first priority level.

In some aspects, the connection information may include one or more of identification data for each group of nodes communicating during the at least one time slot, a set of enhanced distributed channel access parameters for the groups of nodes communicating during the at least one time slot, and a time slot parameter identifying the at least one time slot. The identification data may include at least one of an identification code associated with one or more nodes in one or more groups of nodes, a range of identification codes associated with one or more nodes in one or more groups of nodes, and an index of predefined identification codes for one or more groups of nodes.

In some aspects, the set of enhanced distributed channel access parameters may include one or more of a minimum contention window size, a maximum contention window size, an arbitration inter-frame space number, and a transmit opportunity for each group of nodes. The time slot parameter may include a start time and a duration field for the at least one time slot or a start time and an end time for the time slot. The at least one of the soft TDM assignment fields may include one or more of information identifying operating channels of an enhanced distributed channel access, default enhanced distributed channel access parameters to be used by unspecified nodes during the at least one time slot, enhanced distributed channel access parameters to be used per group of nodes during a second time slot that is different from the at least one time slot, and default enhanced distributed channel access parameters to be used by nodes outside of any specified time slot.

In some aspects, the at least one of the soft TDM assignment fields may be sent in at least one of a beacon, a probe request message, a probe response message, an association request message, or an association response message. The at least one time slot may include a plurality of time slots that each repeat on a recurring schedule and the at least one of the soft TDM assignment fields may comprise periodicity information. The at least one of the soft TDM assignment field may convey the connection information associated with each time slot in every period to at least one of a plurality of groups of nodes scheduled to communicate during that time slot in every period. The signal may include a common enhanced distributed channel access parameters for a primary group of nodes and a secondary group of nodes to use during each time slot in every period. Each soft TDM assignment field may identify nodes to use the common enhanced distributed channel access parameters as the primary group of nodes and nodes to use the common enhanced distributed channel access parameters as the secondary group of nodes.

In a third set of illustrative embodiments, an apparatus for wireless communication is described. The apparatus may include: at least one processor; a memory in electronic communication with the at least one processor; and instructions stored in the memory, the instructions being executable by the at least one processor. The instructions may be executable by the processor to: send a signal comprising one or more soft TDM assignment fields to a first group of nodes, wherein at least one of the soft TDM assignment fields is configured to convey connection information to the first group of nodes to communicate during at least one time slot at a first priority level that is different from a second priority level of a second group of nodes communicating during the at least one time slot; and communicate with at least one node from the first group of nodes during the at least one time slot at the first priority level.

In a fourth set of illustrative embodiments, a method for wireless communication is described. The method may include: identifying at least one primary node to communicate during at least one non-concurrent time slot of an enhanced distributed channel access; identifying at least one secondary node to communicate during the at least one non-concurrent time slot; and sending a signal to the at least one secondary node to convey connection information, the connection information for the secondary node to communicate during the non-concurrent time slot, the secondary node communicating during the non-concurrent time slot at a first priority level that is different from a second priority level of the primary node.

In some aspects, the connection information may be conveyed in a beacon sent from an access point, and the method may also include communicating with the at least one secondary node based upon the secondary node receiving the beacon from the access point. The method may also include broadcasting, by at least one access point operating on the enhanced distributed channel access, connection information comprising a non-concurrent time slot schedule, an enhanced distributed channel access configuration information, and an indicator field identifying whether the at least one access point permits secondary nodes to communicate during the non-concurrent time slot at the first priority than the primary node.

In some aspects, the method may also include broadcasting, by at least one access point operating on the enhanced distributed channel access, connection information associated with the at least one access point and connection information associated with at least one neighbor access point. The connection information for the at least one access point and the at least one neighbor access point may include a non-concurrent time slot schedule for each access point, an enhanced distributed channel access configuration information for each access point, and an indicator field identifying whether each access point permits secondary nodes to communicate during the non-concurrent time slot at the first priority.

In some aspects, the connection information may include a soft TDM assignment field for the non-concurrent time slot. The soft TDM assignment field may include one or more of an indicator field identifying whether an access point permits secondary nodes to communicate during the non-concurrent time slot at the a first priority that is different from a second priority level of the primary node, an enhanced distributed channel access configuration information for the primary node, and an enhanced distributed channel access configuration information for the secondary node. The soft TDM assignment field may include one or more of identification data identifying the at least one primary node and the at least one secondary node. The identification data may include at least one of an identification code associated with one or more nodes in one or more groups of nodes, a range of identification codes associated with one or more nodes in one or more groups of nodes, and an index of predefined identification codes for one or more groups of nodes.

In some aspects, the at least one non-concurrent time slot may be repeated on a recurring schedule and the soft TDM assignment fields may include periodicity information. The soft TDM assignment field may convey to at least one node a first non-concurrent time slot and one or more subsequent non-concurrent time slots to communicate during using the connection information associated with the first non-concurrent time slot.

In some aspects, the secondary node communicating during the non-concurrent time slot at the first priority level different from the second priority level of the primary node may use reduced enhanced distributed channel access parameters with respect to enhanced distributed channel access parameters used by the primary node. The reduced enhanced distributed channel access parameters used by the secondary nodes may include, with respect to the enhanced distributed channel access parameters used by the primary node, one or more of a larger minimum contention window size, a larger maximum contention window size, a larger arbitration inter-frame space number, and a shorter transmit opportunity.

In some aspects, the secondary node communicating during the non-concurrent time slot at the first priority level different from the second priority level of the primary node may reduce a carrier clearance assessment energy detection threshold for the secondary nodes in relation to a carrier clearance assessment energy detection threshold for the primary nodes.

In some aspects, the secondary node communicating during the non-concurrent time slot at the first priority level different from the second priority level of the primary node may receive from an access point operating on the enhanced distributed channel access, a signal indicating that the access point has no information to communicate during the non-concurrent time slot; and communicate during the non-concurrent time slot based on receiving the signal.

In some aspects, the secondary node communicating during the non-concurrent time slot at the first priority level different from the second priority level of the primary node may determine that an access point operating on the enhanced distributed channel access is not communicating with any of the primary nodes for a predetermined time threshold during the non-concurrent time slot; and communicates during the non-concurrent time slot based on the determination.

In a fifth set of illustrative embodiments, an apparatus for wireless communication is described. The apparatus may include: a non-concurrent time slot access component configured to identify at least one primary node to communicate during at least one non-concurrent time slot of an enhanced distributed channel access and to identify at least one secondary node to communicate during the at least one non-concurrent time slot; and a transmitter configured to send a signal to the at least one secondary node to convey connection information, the connection information for the secondary node to communicate during the non-concurrent time slot, the secondary node communicating during the non-concurrent time slot at a first priority level that is different from a second priority level of the primary node.

In some aspects, the connection information may be conveyed in a beacon sent from an access point, the non-concurrent time slot access component further configured to communicate with the at least one secondary node based upon the secondary node receiving the beacon from the access point. The non-concurrent time slot access component further configured to: broadcast, by at least one access point operating on the enhanced distributed channel access, connection information comprising a non-concurrent time slot schedule, an enhanced distributed channel access configuration information, and an indicator field identifying whether the at least one access point permits secondary nodes to communicate during the non-concurrent time slot at the different priority than the primary node.

In a sixth set of illustrative embodiments, an apparatus for wireless communication is described. The apparatus may include: at least one processor; a memory in electronic communications with the at least one processor; and instructions stored in the memory, the instructions being executable by the at least one processor. The instructions may be executable by the at least one processor to: identify at least one primary node to communicate during at least one non-concurrent time slot of an enhanced distributed channel access; identify at least one secondary node to communicate during the non-concurrent time slot; and send a signal to the at least one secondary node to convey connection information, the connection information for the secondary node to communicate during the non-concurrent time slot, the secondary node communicating during the non-concurrent time slot at a first priority level that is different from a second priority level of the primary node.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 5A and 5B show diagrams of examples of soft TDM field for periodic operations according to various aspects of the present disclosure;

DETAILED DESCRIPTION

Figure 1:
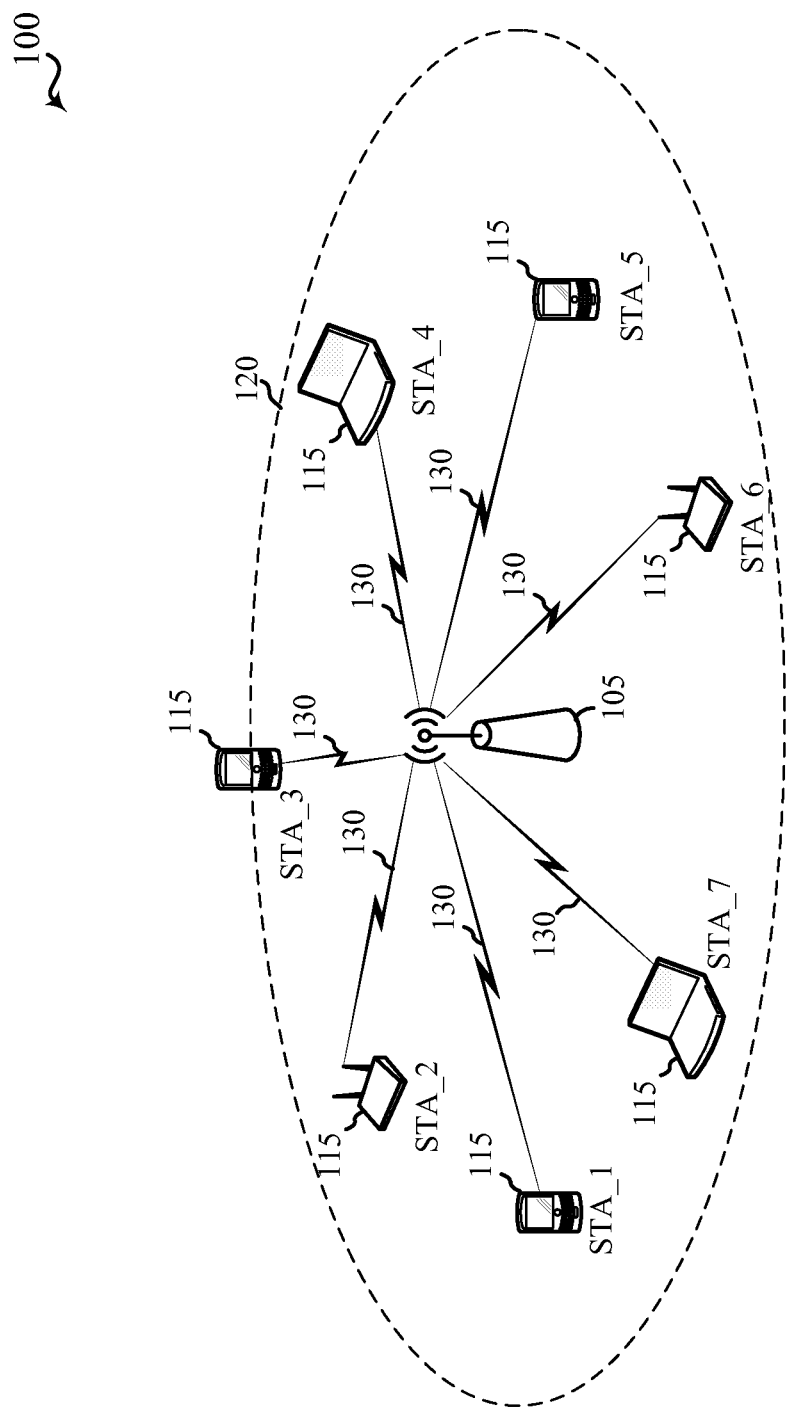
FIG. 1 shows a diagram that illustrates an example of a wireless local area network (WLAN) that supports enhanced distributed channel access (EDCA) based operations according to various aspects of the present disclosure.

The described examples are directed to methods, systems, devices, and apparatuses for signaling soft time division multiplexing (TDM) in a wireless communications network that may ensure time slot utilization through various signaling schemes. Efficient use of one or more time slots in enhanced distributed channel access (EDCA) operations may allow stations (STAs) (or nodes) to successfully communicate information in a timely manner while maximizing time frequency resources. For example, soft TDM assignment fields may be sent to one or more groups of STAs communicating on the wireless network. One or more of the soft TDM assignment fields may be sent to a group of STAs to communicate during a time slot and include connection information for the time slot. One or more STAs of the group of STAs may utilize the connection information to communicate during the time slot at a lower priority level than STAs from a different group of STAs that communicate during the time slot. In some examples, one or more STAs of the group of STAs may utilize the connection information to communicate during the time slot at a higher priority level than STAs from a different group of STAs that communicate during the time slot. In some examples, the connection information may also provide one or more backoff rules for the communicating STAs to use for backoff operations at a boundary of the time slot.

Soft TDM signaling may be achieved, according to certain examples, for non-concurrent STAs as well. Primary and secondary STAs may be identified. The secondary STAs may communicate during a non-concurrent time slot. Connection information may be communicated to the secondary STAs where the secondary STAs use the connection information to communicate during the non-concurrent time slot. The secondary STAs may communicate, however, at a different priority level than the primary STA that communicate during the non-concurrent time slot.

The soft TDM signaling techniques presented herein are generally described in connection with wireless local area networks (WLANs) for simplicity. The same or similar techniques, however, may be used for various other wireless communications systems such as Wi-Fi networks, cellular wireless systems, peer-to-peer wireless communications, ad hoc networks, satellite communications systems, and other systems. These wireless communication systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to an implementation of radio communication technologies called a Radio Access Technology (RAT). A wireless communication system or network that implements a Radio Access Technology may be called a Radio Access Network (RAN). The terms "system" and "network" may be used interchangeably. The terms wireless station ("STA") and "node" may be used interchangeably.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a WLAN 100 is shown that is configured to provide soft TDM signaling in EDCA, according to various aspects of the present disclosure. The WLAN 100 includes an AP 105 and multiple associated wireless stations (or STAs) 115. In this example, there are shown seven (7) STAs 115, which are identified as STA_1, STA_2, STA_3, STA_4, STA_5, STA_6, and STA_7. The WLAN 100, however, may have more or fewer stations 115 than those shown in FIG. 1 since the number shown is simply for illustrative purposes. In some examples, the STAs 115 may be divided into one or more groups where different groups communicate during different time slots (or TXOP) associated with the EDCA configuration. The STAs 115 may be divided into groups based on, for example, distance from AP 105, types of information to communicate, configuration of STA 115, and the like. The STAs 115 from a group 1 may communicate during a first time slot, STAs 115 from a group 2 may communicate during a second time slot, and so on. The authorized STAs 115 may communicate during the time slots on a recurring or periodic schedule.

The AP 105 and the associated STAs 115 may represent a basic service set (BSS). The various stations (STAs) 115 in the BSS are able to communicate with one another through the AP 105. Also shown is a coverage area 120 of the AP 105, which may represent a basic service area (BSA) of the WLAN 100. Although not shown in FIG. 1, the BSS associated with the WLAN 100 may be connected to a wired or wireless distribution system (DS) that allows multiple APs to be connected in an extended service set.

The AP 105 may be configured to communicate bi-directionally with each of the STAs 115 using transmissions 130. The transmissions 130 may include downlink transmissions (e.g., beacon frames) that are sent from the AP 105 to a STA 115 as well as uplink transmissions of data frames that are sent from a STA 115 to the AP 105. Different STAs 115 transmitting using a wireless medium simultaneously may result in collisions in transmissions, which may degrade the efficiency of the WLAN 100. EDCA rules may provide for the STAs 115 to be divided into groups to avoid such collisions where each group of STAs 115 is associated with a dedicated time slot. Each group of STAs 115 may communicate during an associated time slot. Following a time slot (e.g., TXOP), a station 115 may wait for a backoff period prior to attempting another transmission. The backoff period may be set based on a contention window (CW) value that is defined for the WLAN 100, as a value between a minimum CW value (CWmin) and a maximum CW value (CWmax). Contention mechanisms may provide for a STA 115 attempting retransmissions following backoff periods following each detection of a collision.

Soft TDM in EDCA may allow the STAs 115 from a group of STAs 115 to access the time slots with a different priority than a second group of STAs 115. For example, the STAs 115 may communicate during the time slot at a lower priority than STAs 115 from the second group if the STAs 115 of the second group have no traffic to communicate during the time slot. According to various techniques described in more detail below, improved signaling of soft TDM information in EDCA may provide for improved utilization of resources by STAs 115. The described techniques may provide for sending soft TDM signaling to convey connection information associated with a wireless medium, e.g., EDCA connection parameters, time slot information, STA 115 group parameters, periodicity information, etc. Additionally or alternatively, backoff rule information may also be conveyed in the soft TDM assignment information. One or more STAs 115 may receive the backoff rule and control one or more backoff timers accordingly.

The WLAN 100 may also be configured to support non-concurrent (NC) time slots that provide for orthogonal time slots assigned to STAs 115 positioned at the edge of coverage area 120 in different BSSs to reduce mutual interference. Certain edge STAs 115 may communicate in a first NC time slot and other STAs 115 may communicate in a second NC time slot. In some aspects, the described techniques may provide for signaling soft TDM assignment information to the edge STAs 115 communicating in the NC time slots that authorizes the edge STAs 115 to access other NC time slots. The secondary edge STAs 115 may be permitted to communicate during a NC time slot if a primary STA 115 has no traffic to communicate during the NC time slot, for example.

Figure 2:
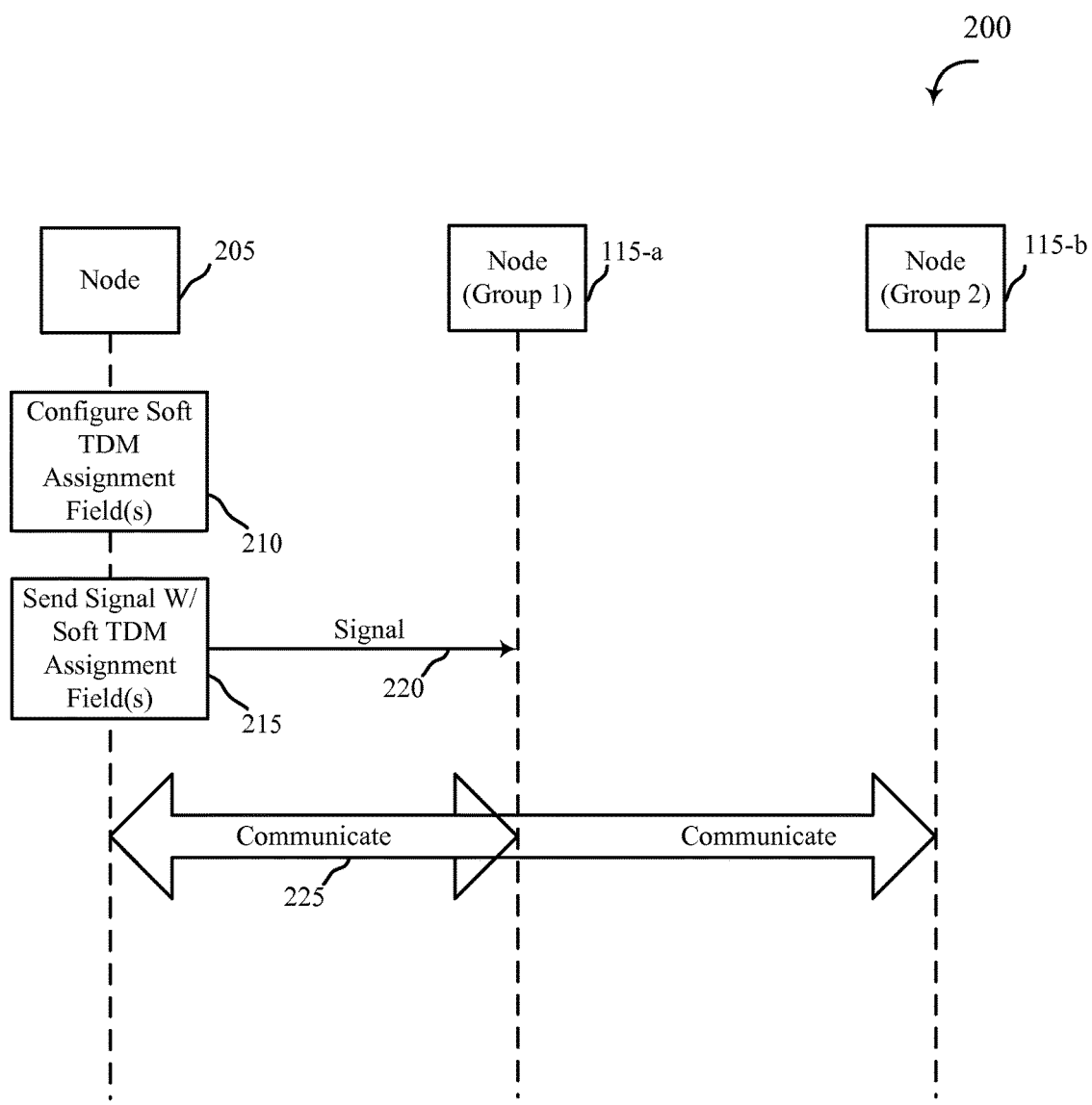
FIG. 2 shows a signal flow diagram of a wireless communication system according to various aspects of the present disclosure.

FIG. 2 is a signal flow diagram 200 illustrating communication in a wireless communication system according to various aspects of the present disclosure. The signal flow diagram 200 may illustrate aspects of the WLAN 100 described with reference to FIG. 1. The signal flow diagram 200 includes a first node 205, a second node 115-*a*, and a third node 115-*b*. The second node 115-*a* may be associated with a first group of nodes and the third node 115-*b* may be associated with a second group of nodes. The first node 205 may be an example of the AP 105 and/or the wireless stations (STAs) 115 described with respect to the WLAN 100 of FIG. 1. The second node 115-*a* and the third node 115-*b* may be examples of the wireless STAs 115 described above with respect to the WLAN 100 of FIG. 1. Although the signal flow diagram 200 only shows one node (115-*a* and 115-*b*) associated with the first and second groups of nodes, the first and second groups of nodes may have more or fewer nodes 115. The signal flow diagram 200 may, for example, illustrate soft TDM assignment signaling in an EDCA environment.

The first node 205 may configure one or more soft TDM assignment fields at 210. At least one of the soft TDM assignment fields may include connection information to convey to the nodes from group 1 (e.g., the second node 115-*a*) an authorization for the nodes to communicate during at least one time slot. The at least one soft TDM assignment field may include information identifying each group of nodes communicating during the at least one time slot, channel access parameters for the EDCA configuration for the at least one time slot, parameters identifying the at least one time slot, and the like. At 215, the first node 205 may send a signal 220 to the node(s) from the first group of nodes (e.g., the second node 115-*a*) that includes the soft TDM assignment field. The first node 205 may communicate with the second node 115-*a* at 225 during the at least one time slot using the connection information conveyed in the soft TDM assignment field. The first node 205 may also communicate with the third node 115-*b* at 225. The first node 205 may communicate with the second node 115-*a* at a lower or higher priority level with respect to the third node 115-*b*.

Figure 3:
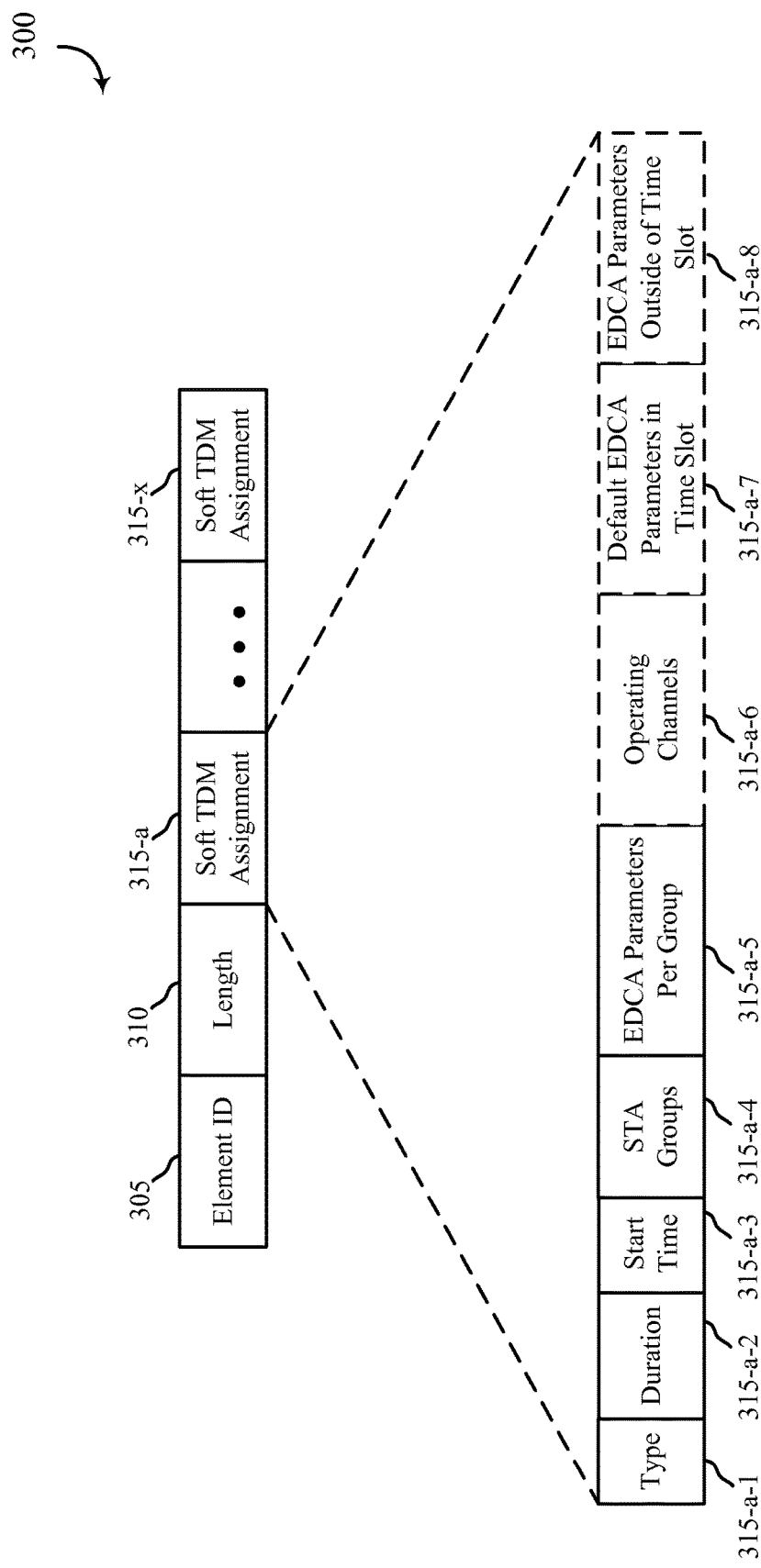
FIG. 3 shows a diagram of an example soft time division multiplexing (TDM) signaling information element according to various aspects of the present disclosure.

FIG. 3 shows a diagram 300 of an example soft TDM signaling information element according to various aspects of the present disclosure. The soft TDM signaling information element of the diagram 300 may be an example of the signal 220 communicated to the STA or node 115, as described with reference to FIG. 1 or 2. The soft TDM signaling information element may include an element identification (ID) field 305, a length field 310, and one or more soft TDM assignment fields 315 (shown as fields 315-*a* to 315-*x* for ease of reference). The element ID field 305 may contain an identification indicating this is a soft TDM information element. The length field 310 may include information indicative of the length (e.g., bit length, frames occupied, etc.) associated with the remaining contents in the information element. The soft TDM assignment fields 315 may include connection information that permits nodes to communicate during time slots. The soft TDM signaling information element may be communicated as a data payload in broadcast, unicast, and/or multicast frames.

At least one of the soft TDM assignment fields 315 may include connection information that permits nodes otherwise unauthorized to communicate during a time slot to communicate during the prohibited time slot. For example, the soft TDM assignment field 315-*a* may include a type field 315-*a*-1, a duration field 315-*a*-2, a start time field 315-*a*-3, a station groups field 315-*a*-4, and an EDCA parameters per node group field 315-*a*-5. The soft TDM assignment field 315-*a* may, additionally or alternatively, include an operating channels field 315-*a*-6, a default EDCA parameters in time slot field 315-*a*-7, and an EDCA parameters outside of time slot field 315-*a*-8. The component parts, individually or collectively, may provide the connection information necessary for the unauthorized nodes to communicate during a prohibited time slot.

The type field 315-*a*-1 may include information identifying the type of information being conveyed, e.g., a soft TDM assignment for a group of nodes during a time slot. The duration field 315-*a*-2 may include information indicative of the duration of the time slot associated with the soft TDM assignment field 315, e.g., a first soft TDM assignment field associated with a first time slot. The start time field 315-*a*-3 may include information indicative of the time the associated time slot begins. A node or STA 115 may determine a stop time for the associated time slot using the start time field 315-*a*-3 and the duration field 315-*a*-2. In some example, the soft TDM assignment field 315-*a* may include a start time field and a stop time field for the associated time slot. The station groups field 315-*a*-4 may include information identifying which stations 115 are assigned to which group of the EDCA configuration. That is, the station groups field 315-*a*-4 may include identification data indicative of an identification code associated with one or more nodes in one or more groups of nodes, a range of identification codes associated with one or more nodes in one or more groups of nodes, and/or an index of predefined identification codes for one or more groups of nodes. The identification code associated with each node may be the node's association identification, assigned by the access point. The index for a group of nodes may be a multicast MAC address assigned to the group by the access point. The identification data may be explicitly signaled in the station groups field 315-*a*-4. Alternatively, a range of identification data per group, or an index to identification data for a group of nodes can be conveyed in the station groups field 315-*a*-4.

The EDCA parameters per group field 315-*a*-5 may include information indicative of EDCA parameters associated with each group of nodes, including a minimum contention window size, a maximum contention window size, an arbitration inter-frame space number, and a transmit opportunity. The EDCA parameters per group field 315-*a*-5, for example, may include at least a portion of the connection information associated with nodes from a group of nodes to communicate during a time slot (i.e., a time slot in which another group of nodes communicate). The EDCA parameters may be explicitly signaled in the EDCA parameters per group field 315-*a*-5 or, alternatively, an index to predefined EDCA parameters may be conveyed.

In some embodiments, the soft TDM assignment field 315-*a* may include additional or alternative information associated with soft TDM signaling. For instance, the soft TDM assignment field 315-*a* may include the operating channels field 315-*a*-6 that includes information indicative of operating channels of the soft TDM operation. The soft TDM assignment field 315-*a* may include the default EDCA parameters in time slot field 315-*a*-7 that includes information indicative of default EDCA parameters to be used by unspecified nodes (i.e., nodes not assigned to a group) to communicate during the time slot. The EDCA parameters outside of time slot field 315-*a*-8 may include information indicative of EDCA parameters to be used by nodes outside of any time slot, e.g., connection information for nodes not configured to support EDCA operations or nodes communicating outside of a time slot.

In some embodiments, the soft TDM assignment fields 315 may be sent in a beacon, a probe request message, a probe response message, an association request message, or an association response message.

Figure 4:
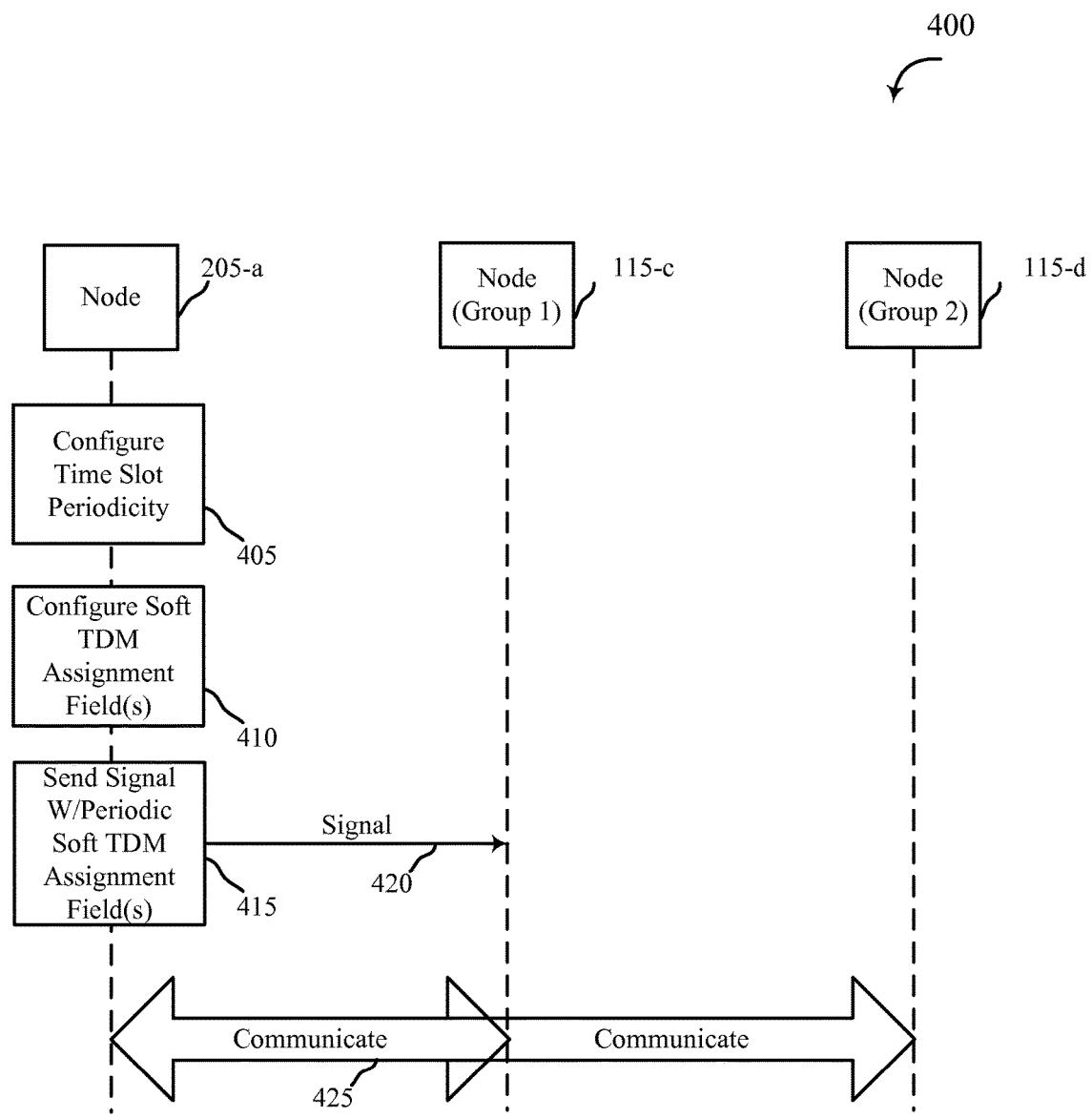
FIG. 4 shows a signal flow diagram of a wireless communication system according to various aspects of the present disclosure.

FIG. 4 is a signal flow diagram 400 illustrating communication in a wireless communication system according to various embodiments. The signal flow diagram 400 may illustrate aspects of the WLAN 100 described with reference to FIG. 1. The signal flow diagram 400 includes a first node 205-*a*, a second node 115-*c*, and a third node 115-*d*. The second node 115-*c* may be associated with a first group of nodes and the third node 115-*d* may be associated with a second group of nodes. The first node 205-*a* may be an example of the AP 105 and/or the wireless STAs 115 described with respect to the WLAN 100 of FIG. 1. The second node 115-*c* and the third node 115-*d* may be examples of the wireless stations 115 described above with respect to the WLAN 100 of FIG. 1. Although the signal flow diagram 400 only shows one node (115-*c* and 115-*d*) associated with each group of nodes, the first group of nodes and/or the second group of nodes may have more or fewer nodes 115. The signal flow diagram 400 may, for example, illustrate soft TDM assignment signaling for periodic soft TDM operations.

The first node 205-a may configure time slot periodicity at 405. The time slot periodicity information may be associated with one or more time slots that are repeated in a recurring fashion. For instance, the EDCA configuration may provide for four time slots that are repeated on a recurring schedule (T0, T1, T2, T3, T0, T1, etc.). The time slot periodicity information may, for example, include information indicative of the periodic nature of the time slots, what EDCA connection parameters are associated with each time slot per group of nodes, etc. The time slot periodicity may convey to at least one group of a group of nodes a first time slot and one or more subsequent time slots for communication using the connection information associated with the first time slot. That is, the at least one group of a group of nodes may use the same connection information to communicate during every recurrence of the T0 time slot, for example.

The first node 205-a may configure one or more soft TDM assignment fields at 410. At least one of the soft TDM assignment fields may include connection information to convey to the nodes from the first group of the group of nodes (e.g., the second node 115-c) connection information for the nodes to communicate during a time slot. The at least one soft TDM assignment field may include information identifying each group of nodes communicating during the time slot, channel parameters for the EDCA configuration for the time slot, parameters identifying the time slot, and the like. Further, the soft TDM assignment field may also convey the periodicity information such that the nodes can communicate using the connection information during subsequent occurrences of the time slot. At 415, the first node 205-a may send a signal 420 to the node from the first group of nodes (e.g., node 115-c) that includes the soft TDM assignment field with the periodicity information. The first node 205-a may communicate with the second node 115-c at 425 during the time slot using the connection information conveyed in the soft TDM assignment field, as well as subsequent occurrences of the prohibited time slot. Similarly, the first node 205-a may communicate with the third node 115-d from the second group of nodes during the time slot, as well as subsequent occurrences of the time slot. The first node 205-a may communicate with the second node 115-c during the time slot (and subsequent occurrences of the time slot) at a priority level lower or higher than the priority of the third node 115-d of the second group of nodes.

FIGS. 5A and 5B show diagrams 500-a, 500-b of examples of soft TDM assignment fields for periodic operations according to various aspects of the present disclosure. The soft TDM assignment fields of the diagram 500 may be an example of at least a portion of the signal 420 communicated to the node 115-c, as described with reference to the signal flow diagram 400 of FIG. 4. Referring first to FIG. 5A, the soft TDM assignment field may include a type field 505, a duration field 510, a start time field 515, a periodicity field 520, a number of periods field 525, and one or more mapping set fields 530 (shown as mapping set fields 530-a to 530-n, where n is a whole number). The type field 505 may include information indicative of the type of soft TDM assignment being conveyed, e.g., that a periodic soft TDM assignment field is being conveyed. The duration field 510 and the start time field 515 may include information associated with a first instance of the time slot (time slot T0 for example). The start time field 515 and the duration field 510 may provide information used to determine the stop time for the time slot. In some examples, the duration field 510 may be replaced with a stop time field to explicitly signal the time slot information. The periodicity field 520 may include information indicative of the period of time slot occurrences in time units. The number of periods field 525 may include information indicative of the number of periods that the nodes may use the connection information to communicate during the repeated time slot.

At least one of the mapping set fields 530 may include information explicitly mapping between node groups and EDCA parameters, such as discussed above with reference to the soft TDM assignment field 315. In some examples, mappings may be defined and cyclically repeated across time slots. The component parts, individually or collectively, of the soft TDM Assignment field for periodic operations may provide the connection information necessary for the nodes (e.g., the second node 115-c of signal flow diagram 400) to communicate during more than one occurrence of a time slot at a lower or higher priority level than other nodes (e.g., the third node 115-d of signal flow diagram 400) communicating during the time slot.

Referring to FIG. 5B, in other examples of periodic operations, the diagram 500-b shows soft TDM assignment field that may include one or more additional or alternative fields. As an example, it may be assumed that two sets of EDCA parameters are to be conveyed for each time slot. A first set of EDCA parameters may be associated with one or more primary nodes of a group of nodes and the second set of EDCA parameters may be associated with one or more secondary nodes of a group of nodes. The primary nodes may be configured to communicate during the time slot at a higher priority than the secondary nodes. In some configurations, the first and second set of EDCA parameters may be used by the groups of nodes during multiple time slots. According to this example, the soft TDM assignment field of diagram 500-b may, alternatively include the EDCA parameters for primary and secondary nodes as well as identification information assigning nodes to a primary group or a secondary group on a per time slot basis.

The soft TDM assignment field may include a type field 505-a, a duration field 510-a, a start time field 515-a, a periodicity field 520-a, a number of periods field 525-a, a primary/secondary EDCA parameters field 535, and one or more primary node group fields 540 (shown as primary node group fields 540-a to 540-n, where n is a whole number). The type field 505-a may include information indicative of the type of soft TDM assignment being conveyed, e.g., that a periodic soft TDM assignment field is being conveyed. The duration field 510-a and the start time field 515-a may include information associated with a first instance of the time slot (time slot T0 for example). The start time field 515-a and the duration field 510-a may provide information used to determine the stop time for the time slot. In some examples, the duration field 510-a may be replaced with a stop time field to explicitly signal the time slot information. The periodicity field 520-a may include information indicative of the period of time slot occurrences in time units. The number of periods field 525-a may include information indicative of the number of periods that the nodes may use the connection information to communicate during the repeated time slot.

The primary/secondary EDCA parameters field 535 may include channel access information for the primary group of nodes and the secondary group of nodes. The channel access parameters for each group of nodes may define the access parameters for each group and, in some cases, different access parameters may be defined for the primary and the secondary groups. The primary node group field 540 may include identification fields identifying, on a per time slot basis, which nodes are assigned to the primary group of nodes and which nodes are assigned to the secondary group of nodes. The primary nodes may be identified or assigned per time slot and any other nodes not identified or assigned to the primary group of nodes may communicate as a secondary node having lower priority. Multiple primary node groups may be defined and cyclically repeated across time slots.

Figure 6:
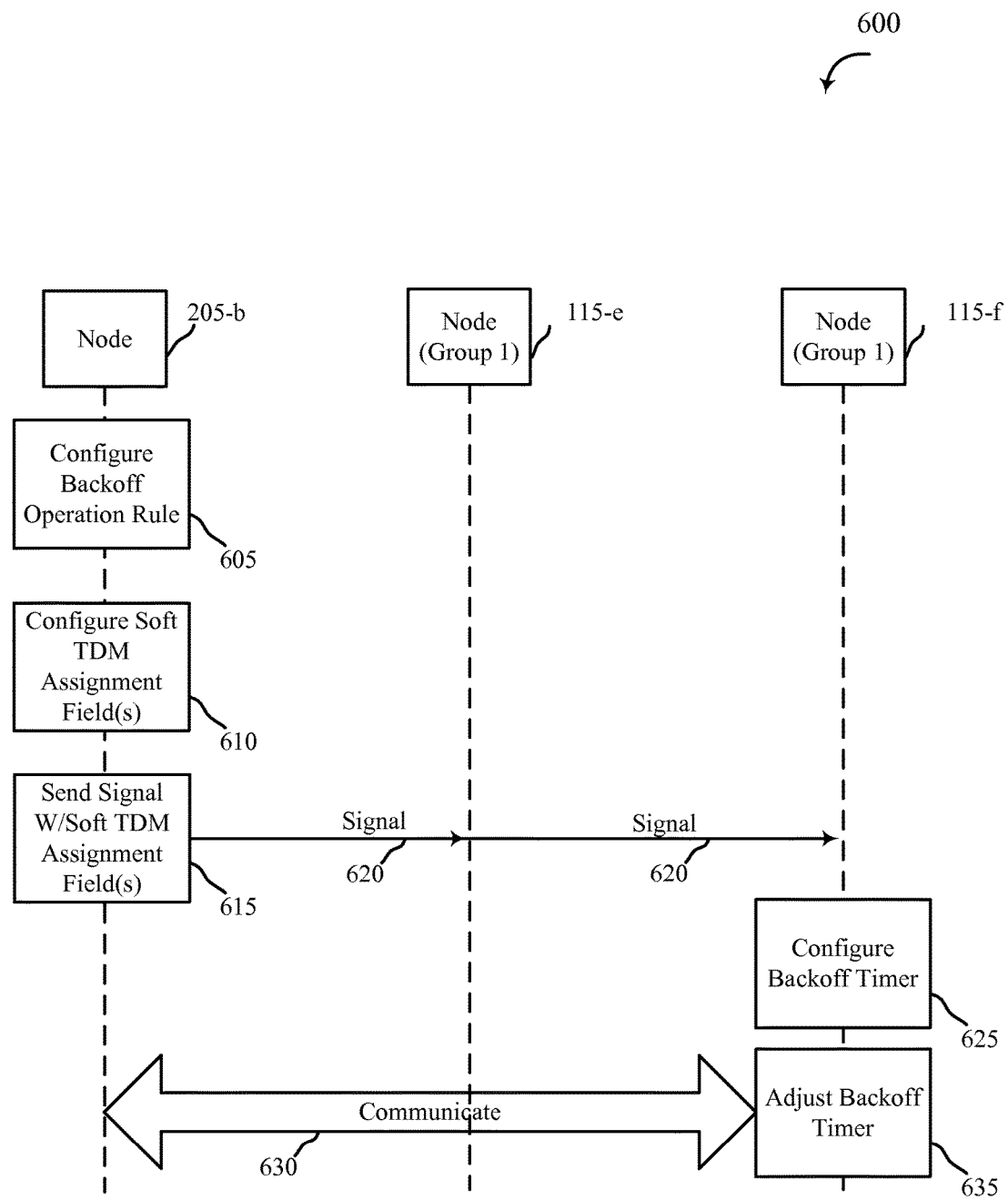
FIG. 6 shows a signal flow diagram of a wireless communication system according to various aspects of the present disclosure.

FIG. 6 is a signal flow diagram 600 illustrating communication in a wireless communication system according to various embodiments. The signal flow diagram 600 may illustrate aspects of the WLAN 100 described with reference to FIG. 1. The signal flow diagram 600 includes a first node 205-*b*, a second node 115-*e*, and a third node 115-*f*. The second node 115-*e* and the third node 115-*f* may be associated with a first group of nodes. The first node 205-*b* may be an example of the AP 105 and/or the wireless stations 115 described with respect to the WLAN 100 of FIG. 1. The second node 115-*e* and the third node 115-*f* may be examples of the wireless stations 115 described above with respect to the WLAN 100 of FIG. 1. Although the signal flow diagram 600 only shows two nodes (115-*e* and 115-*f*) associated with group 1, the first group of nodes may have more or fewer nodes 115. The signal flow diagram 600, for example, may illustrate conveying backoff rules in soft TDM assignment signaling in an EDCA environment. In the discussions regarding signal flow diagram 600 where nodes 115-*e* and 115-*f* are associated with group 1, group 1 may be considered a group of nodes 115 that communicate during a time slot at a different priority level than another group. The nodes 115-*e* and/or 115-*f* of group 1 may include one or more timers associated with backoff operations at a boundary of the time slot.

The first node 205-*b* may configure backoff operation rules at 605. The backoff operation rules may provide information for the nodes communicating during a time slot to use to determine how to handle a backoff timer (or counter) during backoff operations (e.g., reset or pause/resume the backoff timer). As one example, an example backoff rule may provide for each node having a single backoff timer to reset the backoff timer at the start of each time slot the node is communicating in. The soft EDCA assignment field may include backoff rules or corresponding indices for the associated time slot and the backoff timer may be updated within the time slot based on the conveyed backoff rules. While this example may provide for only a single timer to be used by the node, the potential drawback is that the actual total backoff timer per transmission could be unlimited due to the reset at the start of each communicating time slot.

In another example where at least one node has a backoff timer associated with each time slot in a recurring schedule, the backoff operation rule may provide for each timer to be started at the beginning of the corresponding time slot, paused at the end of the corresponding time slot, and then resumed at the beginning of the next occurrence of the same time slot. Each backoff timer may be updated based on the soft TDM assignment information conveyed for the associated time slot in the recurring schedule. While this example may require multiple timers on the nodes, the actual total backoff timer per transmission may be limited, as in a non-TDM configuration.

In yet another example where at least one node has two backoff timers, a backoff operation rule may provide for using a first timer as a primary backoff timer during time slots where the node is a primary node (i.e., the node is assigned to the primary group of nodes) in a recurring schedule. The second backoff timer may be used as a secondary backoff timer during time slots where the node is a secondary node in the recurring schedule. In some aspects, the primary backoff timer may be started at the beginning of an associated time slot, paused at the end of the time slot, and resumed at the next occurrence of the time slot. The secondary counter, however, may be reset at the beginning of each time slot the node is assigned to the group of secondary nodes.

As can be seen, various backoff operation rules may be configured at 605 depending on a number of factors.

The first node 205-*b* may configure one or more soft TDM assignment fields at 610. At least one of the soft TDM assignment fields may include connection information to convey to the nodes from the first group of the group of nodes (e.g., nodes 115-*c* and/or 115-*d*) connection information for the nodes to communicate during at least one time slot. The at least one soft TDM assignment field may include information identifying each group of nodes communicating during the at least one time slot, channel access parameters for the EDCA configuration for the at least one time slot, parameters identifying the at least one time slot, and the like. Further, the soft TDM assignment field may also convey the backoff operation rules to the nodes 115. At 615, the first node 205-*b* may send a signal 620 to the nodes from group node 1 (e.g., the second node 115-*e* and the third node 115-*f*) that includes the soft TDM assignment field with the backoff operation rules. The third node 115-*f*, for example, may configure one or more backoff timers at 625 based, at least in part, on the backoff rules conveyed in the soft TDM assignment field communicated at 620. The third node 115-*f* may adjust the backoff timer (e.g., reset, start, etc.) at 635 and communicate with the first node 205-*b* at 630 during the at least one time slot using the connection information conveyed in the soft TDM assignment field. Although signal flow diagram 600 shows the third node 115-*f* communicating with the first node 205-*b*, it can be appreciated that the second node 115-*e* may additionally or alternatively communicate with the first node 205-*b* based on the connection information and during a recurring time slot.

Figure 7:
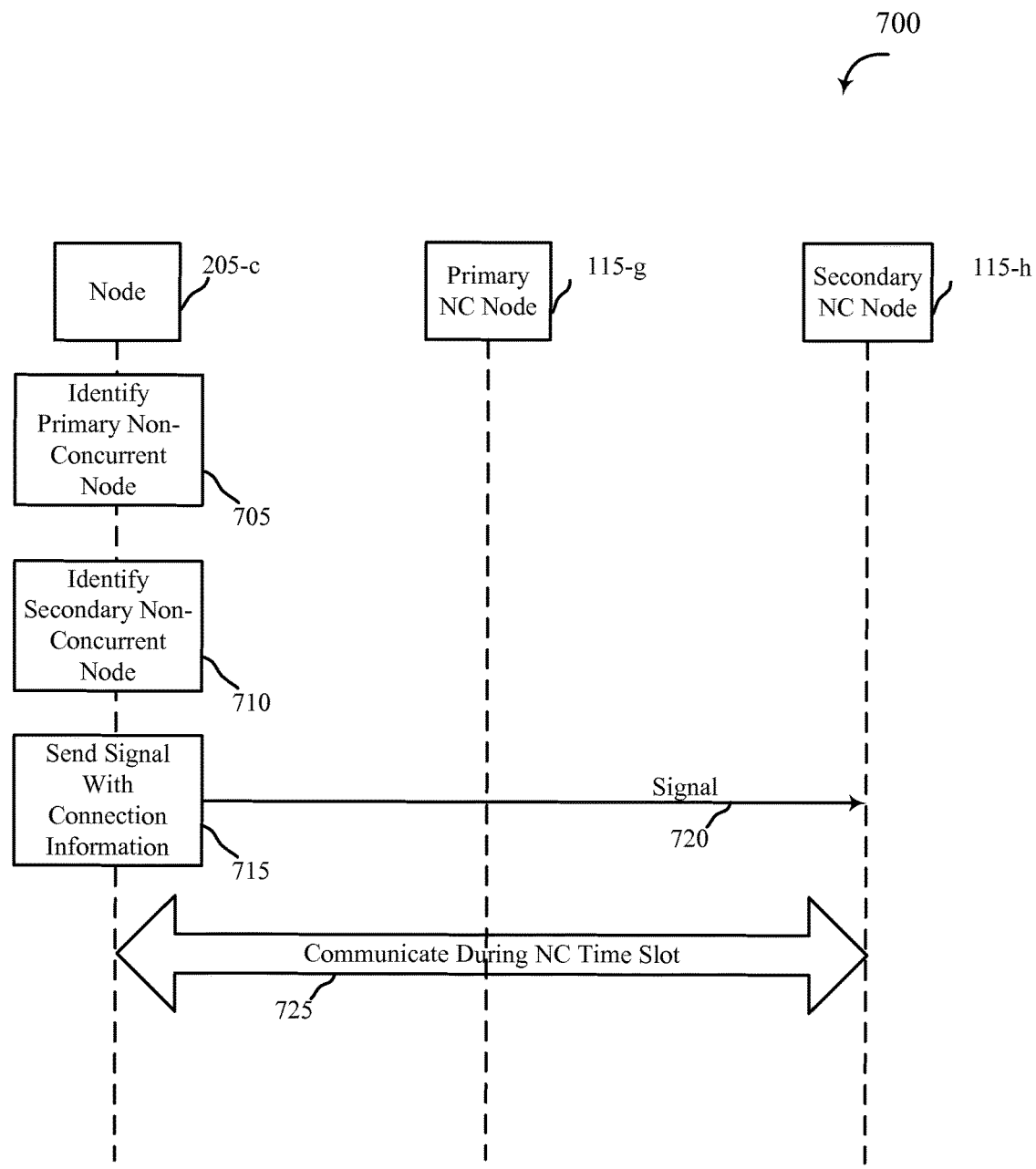
FIG. 7 shows a signal flow diagram of a wireless communication system according to various aspects of the present disclosure.

FIG. 7 is a signal flow diagram 700 illustrating communication in a wireless communication system according to various embodiments. The signal flow diagram 700 may illustrate aspects of the WLAN 100 described with reference to FIG. 1. The signal flow diagram 700 includes a first node 205-*c*, a primary node 115-*g*, and a secondary node 115-*h*. The primary node 115-*g* may be associated, at least for a particular time slot, with a group of primary nodes communicating during the time slot at a higher priority level. The secondary node 115-*h* may be associated, at least for the particular time slot, with a group of secondary nodes communicating during the time slot at a lower priority level. The first node 205-*c* may be an example of the AP 105 and/or the wireless STAs 115 described with respect to the WLAN 100 of FIG. 1. The nodes 115-*g* and 115-*h* may be examples of the wireless stations 115 described above with respect to the WLAN 100 of FIG. 1. Although the signal flow diagram 700 only shows one node associated with the primary group of nodes and one node associated with the secondary group of nodes, each group of nodes may have more or fewer nodes 115. The signal flow diagram 700 may, for example, illustrate conveying soft TDM assignment signaling for non-concurrent nodes in an EDCA environment.

Each of multiple adjacent APs 105 may have a concurrent transmission area that is generally the inner circle portion of the coverage area 120. Within the concurrent transmission area per AP 105, nodes may communicate with their associated AP 105 at the same time as other nodes communicating with their associated adjacent APs 105 with little chance of interference. The APs 105 may have a non-concurrent (NC) transmission area which is generally the outer edges of the coverage area 120. Nodes located in the NC transmission area may, however, cause interference with nodes communicating with an adjacent AP 105 in the NC transmission area of the adjacent AP 105. Accordingly, a predefined time period may be divided into one or more concurrent time slots and one or more NC time slots. During the concurrent time slots (which may be the same for each adjacent AP 105), the nodes within the concurrent transmission area per AP 105 may each communicate with their respective AP 105. During the NC time slots, however, one or more NC nodes may be configured to communicate with their respective AP 105 during an assigned NC time slot. To ensure full utilization of the resources during each NC time slot, the present disclosure may provide for communicating soft TDM assignment information to allow NC nodes to communicate during a NC time slot that the NC node is otherwise not authorized to communicate during.

The present disclosure may provide for defining certain nodes as primary nodes during a particular NC time slot and other nodes as secondary during the particular NC time slot.

The first node 205-c may be configured to identify primary NC nodes at 705. Primary nodes 115-g (e.g., STAs 115, adjacent APs 105, etc.) may communicate during an associated NC time slot. The first node 205-c may be configured to identify secondary NC nodes at 710. The secondary nodes 115-h (e.g., STAs 115, adjacent APs 105, etc.) may communicate during the NC time slot. A node may be assigned to a primary group of nodes during a first NC time slot and assigned to a secondary group of nodes during a second NC time slot. The primary nodes may communicate during the particular NC time slot at a priority level higher than the secondary nodes. The primary and/or secondary nodes may be identified based, at least in part on a soft TDM assignment field that includes one or more of identification data at least for one of the group of primary nodes and the group of secondary nodes. The identification data may include at least one of an identification code associated with one or more nodes in one or more groups of nodes, a range of identification codes associated with one or more nodes in one or more groups of nodes, and an index of predefined identification codes for one or more groups of nodes.

At 715, the first node 205-c may configured to send a signal 720 to the secondary node 115-h that conveys the connection information, e.g., a soft TDM assignment field, to permit the secondary node 115-h to communicate during the NC time slot. Various NC soft TDM assignment rules may be provided in the signal. As one example, the secondary node 115-h, may be configured to communicate during the NC time slot at a priority lower or higher than the primary node 115-g. The lower priority level may be achieved by using less aggressive EDCA parameter or lower CCA energy detection threshold levels. The secondary node 115-h may communicate during the NC time slot if, for example, the primary node 115-g has no traffic to communicate. In a second example, to prevent hidden nodes issues to the uplink traffic of the primary node, the secondary node 115-h may be configured to communicate during the NC time slot only if locating in the coverage of the primary AP node's AP 105, e.g., the secondary node is able to decode one or more packets from a primary AP 105, e.g., beacon signals. The primary node 115-g may utilize request-to-send/clear-to-send (RTS/CTS) messages to schedule uplink traffic. Accordingly, the secondary node 115-h may defer communicating during the NC time slot if detecting that primary node 115-g is communicating traffic, based on the CTS from the AP 105. The node 115-h may communicate with the first node 205-c at 725 during the NC time slot using the connection information.

In some aspects, the NC time slot soft TDM scheduling may be indicated in a variety of manners. In one example, each AP 105 may broadcast in its beacon signal its NC time slot schedule, EDCA parameters for primary and secondary nodes, individual or group identification fields of primary and secondary nodes, as well as an indicator as to whether the AP 105 is configured to allow secondary nodes to communicate during its NC time slots. If allowed, the primary and secondary nodes may use the EDCA parameters to communicate during the associated NC time slot. In a second example, each AP 105 may broadcast in its beacon signal its neighbor AP 105's NC time slot schedule, an indicator as to whether the neighbor allows secondary nodes to communicate during the NC time slots, and, if allowed, EDCA parameters for the secondary nodes, and individual or group identification fields of at least primary nodes. The nodes may communicate with the neighbor AP 105 during the NC time slot using the signaled EDCA parameters.

In other aspects, one or more information fields may be added to signal the soft TDM in NC time slots. For example, a format for signaling soft TDM in NC time slots may include one or more of an element identification field, a length field, an indicator field for secondary nodes to access the AP during the NC time slot, EDCA parameters field for primary and secondary nodes, individual or group identification fields for primary and secondary nodes, a duration field, a start time field, a periodicity field, and a number of periods field. The soft TDM in NC time slot signaling may be communicated in a beacon signal, for example.

Other configurations of soft TDM in NC time slot may provide for alternatives other than configuring the secondary nodes to communicate at a lower priority during the NC time slots. In one example, the secondary nodes may use a reduced carrier clearance assessment (CCA) energy detection threshold with respect to primary nodes. Accordingly, the secondary nodes will be more likely to defer communicating while primary nodes are communicating during the NC time slot. In another example where primary nodes have no traffic to communicate, the primary AP 105 may explicitly signal the availability of the NC time slot for secondary node use. In yet another example, at the beginning of a NC time slot, the primary AP 105 may poll the primary nodes to determine if they are ready to receive any downlink traffic or send any uplink traffic. If so, the primary AP 105 may send scheduling information for the uplink or downlink traffic, as the case may be. The secondary nodes may communicate during the NC time slot if not detecting any scheduled traffic signaled from the primary AP 105.

Figure 8:
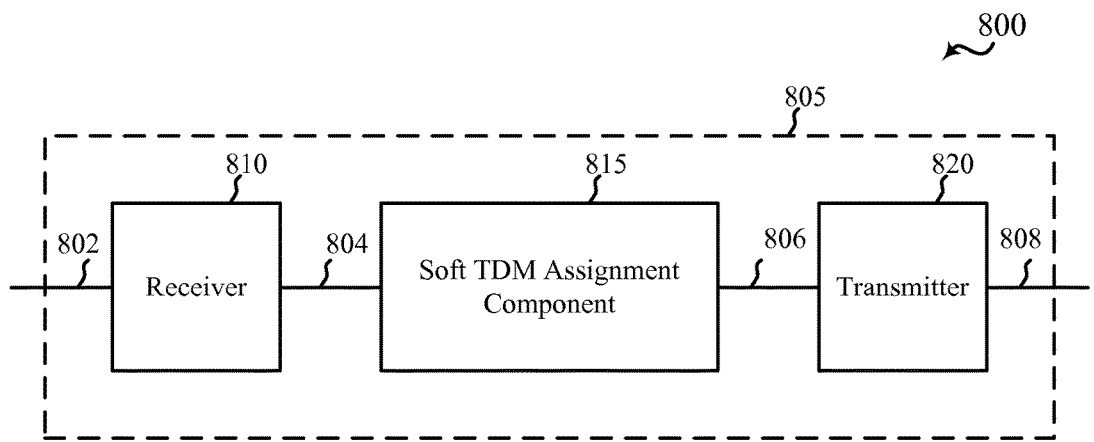
FIG. 8 shows a block diagram of an apparatus configured for communication in a wireless communication system according to various aspects of the present disclosure.

FIG. 8 shows a block diagram 800 of an apparatus 805 for wireless communication, in accordance with various aspects of the present disclosure. In some embodiments, the apparatus 805 may be an example of aspects of the first nodes 205 described with reference to FIG. 2, 4, 6, or 7. In other embodiments, the apparatus 805 may be an example of aspects of the AP 105 and/or the STAs 115 described with reference to FIG. 1.

The apparatus 805 may be an example of a first node 205 configured to signal soft TDM assignment information to provide for nodes of a group of nodes to communicate during at least one time slot. The apparatus 805 may also be a processor. The apparatus 805 may include a receiver 810, a soft TDM assignment component 815, and/or a transmitter 820. Each of these components may be in communication with each other via signals 804 and 806.

The components of the apparatus 805 may, individually or collectively, be implemented using at least one an application specific integrated circuit (ASIC) adapted to perform some or all of the applicable functions in hardware. Alternatively, the functions may be performed by other processing units (or cores), on at least one integrated circuit. In other embodiments, other types of integrated circuits may be used (e.g., Structured/Platform ASICs, field programmable gate arrays (FPGAs), and other Semi-Custom ICs), which may be programmed in any manner known in the art. The functions of each unit may also be implemented, in whole or in part, with instructions embodied in a memory, formatted to be executed by general or application-specific processors. In some embodiments, the components as shown in FIG. 8 each may include a circuit or circuitry for performing the functions described herein.

In some embodiments, the receiver 810 may be or include an radio frequency (RF) receiver such as a WLAN receiver. The receiver 810 may also include other receivers, such as a Wi-Fi receiver and/or a wireless wide area network (WWAN) receiver (e.g., a cellular receiver). The receiver 810 may be used to receive various types of data and/or control signals (i.e., transmissions) over communication links 802 (e.g., physical channels) of a wireless communication system such as the WLAN 100 described with reference to FIG. 1. For example, the receiver 810 may be used to receive one or more messages exchanged during soft TDM assignment signaling.

In some embodiments, the transmitter 820 may be or include an RF transmitter such as a WLAN transmitter. The transmitter 820 may also include other transmitters, such as a Wi-Fi transmitter and/or a WWAN transmitter (e.g., a cellular transmitter). The transmitter 820 may be used to transmit various types of data and/or control signals (i.e., transmissions) over communication links 808 (e.g., physical channels) of a wireless communication system such as the WLAN 100 described with reference to FIG. 1. For example, the transmitter 820 may be used to transmit information associated soft TDM assignment signaling.

In some embodiments, the soft TDM assignment component 815 may be an example of a component that manages the functions described with reference to FIG. 1, 2, 3, 4, 5, 6, or 7. In some examples, the soft TDM assignment component 815 may receive communications via signals 804 from the receiver 810. The soft TDM assignment component 815 be used to configure one or more soft TDM assignment fields sent to a first group of nodes to communicate during a first time slot. At least one of the soft TDM assignment fields may convey connection information to the first group of nodes for communicating during the first time slot. The first group of nodes may communicate during the time slot at a priority level lower or higher than a second group of nodes communicating during the time slot. The soft TDM signaling procedure may include exchanging information between the soft TDM assignment component 815 and nodes of the first group of nodes via the receiver 810 and/or the transmitter 820 via signals 804 and 806.

Figure 9:
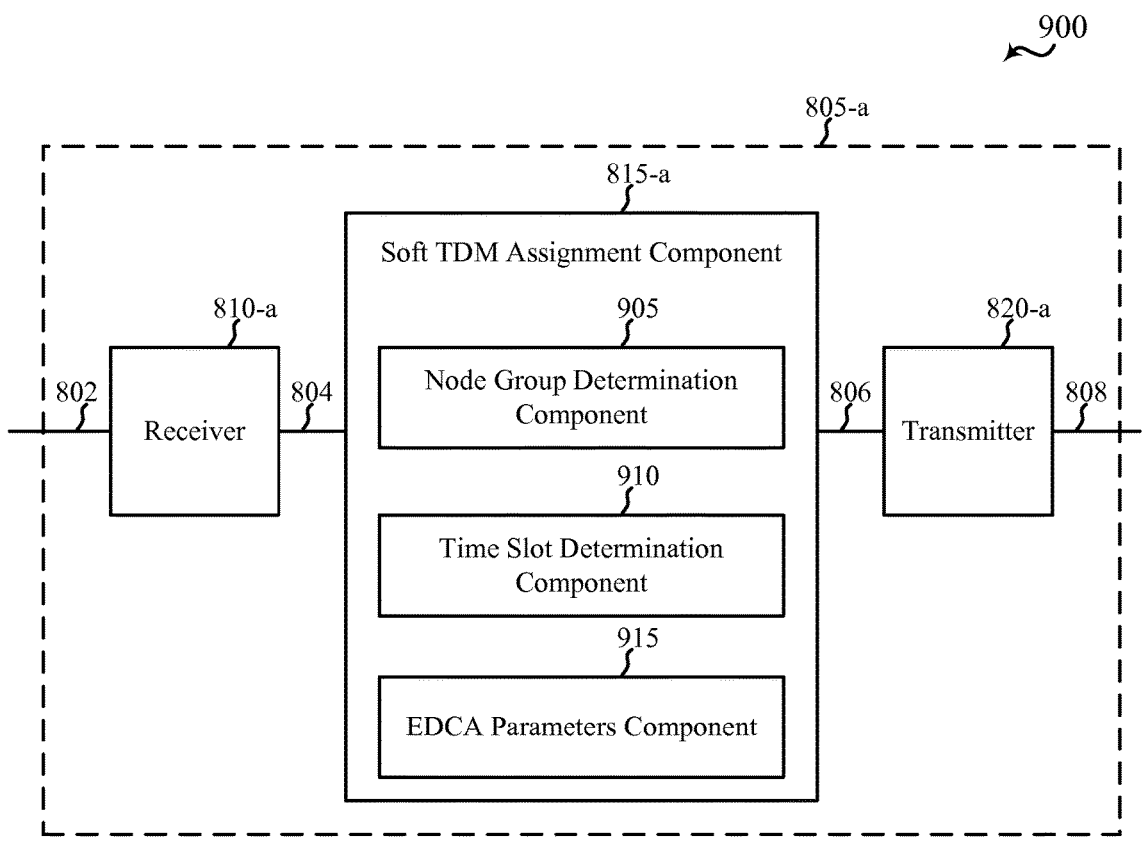
FIG. 9 shows a block diagram of an apparatus configured for communication in a wireless communication system according to various aspects of the present disclosure.

FIG. 9 shows a block diagram 900 of an apparatus 805-a for wireless communication, in accordance with various aspects of the present disclosure. In some embodiments, the apparatus 805-a may be an example of aspects of the first nodes 205 described with reference to FIG. 2, 4, 6, or 7. In other embodiments, the apparatus 805-a may be an example of aspects of the AP 105 and/or the STAs 115 described with reference to FIG. 1.

The apparatus 805-a may be an example of a first node 205 configured to signal soft TDM assignment information to provide for nodes of a group of nodes to communicate during a time slot. The apparatus 805-a may also be a processor. The apparatus 805-a may include a receiver 810-a, a soft TDM assignment component 815-a, and/or a transmitter 820-a. Each of these components may be in communication with each other via signals 804 and 806.

The components of the apparatus 805-a may, individually or collectively, be implemented using at least one ASIC adapted to perform some or all of the applicable functions in hardware. Alternatively, the functions may be performed by other processing units (or cores), on at least one integrated circuit. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors. In some embodiments, the components as shown in FIG. 9 each may include a circuit or circuitry for performing the functions described herein.

In some embodiments, the receiver 810-a may be or include an RF receiver such as a WLAN receiver. The receiver 810-a may also include other receivers, such as a Wi-Fi receiver and/or a WWAN receiver (e.g., a cellular receiver). The receiver 810-a may be used to receive various types of data and/or control signals (i.e., transmissions) over communication links 802 (e.g., physical channels) of a wireless communication system such as the WLAN 100 described with reference to FIG. 1. For example, the receiver 810-a may be used to receive one or more messages exchanged during soft TDM assignment signaling.

In some embodiments, the transmitter 820-a may be or include an RF transmitter such as a WLAN transmitter. The transmitter 820-a may also include other transmitters, such as a Wi-Fi transmitter and/or a WWAN transmitter (e.g., a cellular transmitter). The transmitter 820-a may be used to transmit various types of data and/or control signals (i.e., transmissions) over communication links 808 (e.g., physical channels) of a wireless communication system such as the WLAN 100 described with reference to FIG. 1. For example, the transmitter 820-a may be used to transmit information associated soft TDM assignment signaling.

In some embodiments, the soft TDM assignment component 815-a may be an example of a component that manages the functions described with reference to FIG. 1, 2, 3, 4, 5, 6, or 7. The soft TDM assignment component 815-a may include a node group determination component 905, a time slot determination component 910, and an EDCA parameters component 915. Generally, the soft TDM assignment component 815-a may be used to signal various soft TDM in EDCA.

In some examples, the node group determination component 905 may be configured to identify and/or select one or more nodes of a group of nodes to communicate in an EDCA configuration. The nodes of the group of nodes may communicate during time slots according to the EDCA configuration. The node group determination component 905 may determine which group of nodes communicate during which time slot. The node group determination component 905 may be configured to determine which group of nodes also communicate during the time slot and provide information associated with the group of nodes. The information may be included in one or more soft TDM assignment fields to assign the nodes to the appropriate groups and, where appropriate, identify which node group is a primary node group and which is a secondary node group, in some embodiments. The node group determination component 905 may output identification data for the node groups including an identification code associated with one or more nodes in one or more groups of nodes, a range of identification codes associated with one or more nodes in one or more groups of nodes, or an index of predefined identification codes for one or more groups of nodes.

In some examples, the time slot determination component 910 may be configured to identify time slots associated with EDCA operations and output information indicative of the time slots. The information associated with each time slot may include a start time and a duration field for the each time slot or a start time and an end time for the time slot. The time slot determination component 910 may communicate with the node group determination component 905 to identify which group of nodes communicate during a particular time slot and, when appropriate, which group of nodes is permitted to also communicate during the time slot, but at a lower priority level.

In some examples, the EDCA parameters component 915 may be configured to identify at least a portion of the connection information for EDCA operations on a per time slot basis. For example, the EDCA parameters component 915 may identify and output information indicative of EDCA parameters associated with each group of nodes, a minimum contention window size, a maximum contention window size, an arbitration inter-frame space number, and a transmit opportunity for each group of nodes. In some examples, the EDCA parameters component 915 may also be configured to identify and output information indicative of operating channels of an enhanced distributed channel access, default distributed channel access parameters to be used by nodes unassigned to a group of nodes during the associated time slot, and other distributed channel access parameters to be used by nodes during a second time slot that is different from the first time slot.

The soft TDM assignment component 815-*a* may be configured to send a signal having one or more soft TDM assignment fields to a first group of nodes. The first group of nodes may communicate during at least at least one time slot and at least one of the soft TDM assignment fields may convey connection information to the first group of nodes for them to communicate during the at least one time slot. The signal may be sent to the first group of nodes in a beacon signal, a probe request message, a probe response message, an association request message, or an association response message. The signal may be sent via the transmitter 820-*a*, for example. The first group of nodes may communicate during the at least one time slot at a first priority level that is different from a second priority level of a second group of nodes. In some examples, the first priority level may be a higher priority level than the first priority level. In other examples, the first priority level may be a lower priority level than the second priority level.

Figure 10:
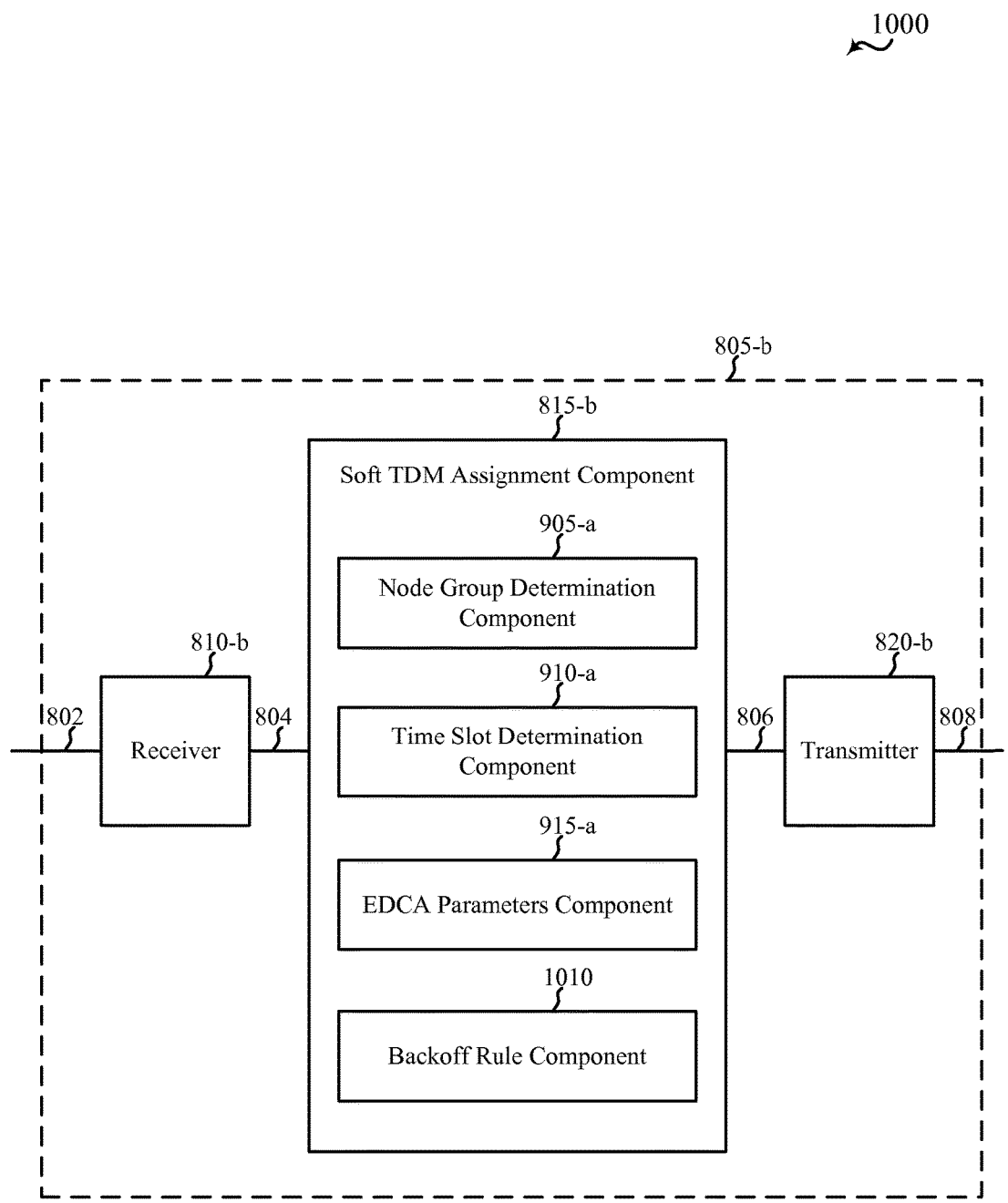
FIG. 10 shows a block diagram of an apparatus configured for communication in a wireless communication system according to various aspects of the present disclosure.

FIG. 10 shows a block diagram 1000 of an apparatus 805-*b* for wireless communication, in accordance with various aspects of the present disclosure. In some embodiments, the apparatus 805-*b* may be an example of aspects of the first nodes 205 described with reference to FIG. 2, 4, 6, or 7. In other embodiments, the apparatus 805-*b* may be an example of aspects of the AP 105 and/or the STAs 115 described with reference to FIG. 1.

The apparatus 805-*b* may be an example of a first node 205 configured to signal soft TDM assignment information to provide for nodes of a group of nodes to communicate during at least one time slot. The apparatus 805-*b* may also be a processor. The apparatus 805-*b* may include a receiver 810-*b*, a soft TDM assignment component 815-*b*, and/or a transmitter 820-*b*. Each of these components may be in communication with each other via signals 804 and 806.

The components of the apparatus 805-*b* may, individually or collectively, be implemented using at least one ASIC adapted to perform some or all of the applicable functions in hardware. Alternatively, the functions may be performed by other processing units (or cores), on at least one integrated circuit. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors. In some embodiments, the components as shown in FIG. 10 each may include a circuit or circuitry for performing the functions described herein.

In some embodiments, the receiver 810-*b* may be or include an RF receiver such as a WLAN receiver. The receiver 810-*b* may also include other receivers, such as a Wi-Fi receiver and/or a WWAN receiver (e.g., a cellular receiver). The receiver 810-*b* may be used to receive various types of data and/or control signals (i.e., transmissions) over communication links 802 (e.g., physical channels) of a wireless communication system such as the WLAN 100 described with reference to FIG. 1. For example, the receiver 810-*b* may be used to receive one or more messages exchanged during soft TDM assignment signaling.

In some embodiments, the transmitter 820-*b* may be or include an RF transmitter such as a WLAN transmitter. The transmitter 820-*b* may also include other transmitters, such as a Wi-Fi transmitter and/or a WWAN transmitter (e.g., a cellular transmitter). The transmitter 820-*b* may be used to transmit various types of data and/or control signals (i.e., transmissions) over communication links 808 (e.g., physical channels) of a wireless communication system such as the WLAN 100 described with reference to FIG. 1. For example, the transmitter 820-*b* may be used to transmit information associated soft TDM assignment signaling.

In some embodiments, the soft TDM assignment component 815-*b* may be an example of a component that manages the functions described with reference to FIG. 1, 2, 3, 4, 5, 6, or 7. The soft TDM assignment component 815-*b* may include a node group determination component 905-*a*, a time slot determination component 910-*a*, an EDCA parameters component 915-*a*, and a backoff rule component 1010. Generally, the soft TDM assignment component 815-*b* may be used to signal various soft TDM in EDCA parameters as well as backoff rules for nodes.

In some examples, the node group determination component 905-*a* may be configured to identify and/or select one or more nodes of a group of nodes to communicate in an EDCA configuration. The nodes of the group of nodes may communicate during time slots according to the EDCA configuration. The node group determination component 905-*a* may determine which group of nodes to communicate during which time slot. The node group determination component 905-*a* may be configured to determine which group of nodes to also communicate during the time slot and provide information associated with the other group of nodes. The information may be included in one or more soft TDM assignment fields to assign the nodes to the appropriate groups and, where appropriate, identify which node group is a primary node group and which is a secondary node group, in some embodiments. The node group determination component 905-*a* may output identification data for the node groups including an identification code associated with one or more nodes in one or more groups of nodes, a range of identification codes associated with one or more nodes in one or more groups of nodes, or an index of predefined identification codes for one or more groups of nodes.

In some examples, the time slot determination component 910-*a* may be configured to identify time slots associated with EDCA operations and output information indicative of the time slots. The information associated with each time slot may include a start time and a duration field for the each time slot or a start time and an end time for the time slot. The time slot determination component 910-*a* may communicate with the node group determination component 905-*a* to identify which group of nodes is to communicate during a particular time slot and, when appropriate, which group of other nodes also communicates during the time slot.

In some examples, the EDCA parameters component 915-*a* may be configured to identify at least a portion of the connection information for EDCA operations on a per time slot basis. For example, the EDCA parameters component 915-*a* may identify and output information indicative of a EDCA parameters associated with each group of nodes, a minimum contention window size, a maximum contention window size, an arbitration inter-frame space number, and a transmit opportunity for each group of nodes. In some examples, the EDCA parameters component 915-*a* may also be configured to identify and output information indicative of operating channels of a enhanced distributed channel access, default enhanced distributed channel access parameters to be used by nodes unassigned to a group of nodes during the associated time slot, and other enhanced distributed channel access parameters to be used by nodes during a second time slot that is different from the first time slot.

In some examples, the backoff rule component 1010 may be configured to determine and convey one or more backoff rules for nodes. As discussed above, the backoff rules may provide rules for the nodes communicating in the EDCA operation to utilize during a boundary of a time slot, e.g., backoff timer handling. The backoff rule component 1010 may be configured to identify and convey information indicative of the backoff rules, such as those described above with respect to FIG. 6.

The soft TDM assignment component 815-*b* may be configured to send a signal having one or more soft TDM assignment fields to a first group of nodes as well as the backoff rules to be used by the nodes to control one or more backoff timers. The first group of nodes may communicate during at least one time slot at a priority different than other nodes and at least one of the soft TDM assignment fields may convey connection information to the first group of nodes for them to communicate during the at least one time slot. The signal may be sent to the first group of nodes in a beacon signal, a probe request message, a probe response message, an association request message, or an association response message. The signal may be sent via the transmitter 820-*b*, for example. The nodes may utilize the backoff rules to control how a backoff timer is handled, e.g., started, paused, resumed, reset, etc., within each time slot. Dependent upon the number of backoff timers at the nodes, the selection of node groups, etc., the backoff rules may be signaled to the nodes as a component of the soft TDM assignment fields and used by the nodes to control the backoff timers.

Figure 11:
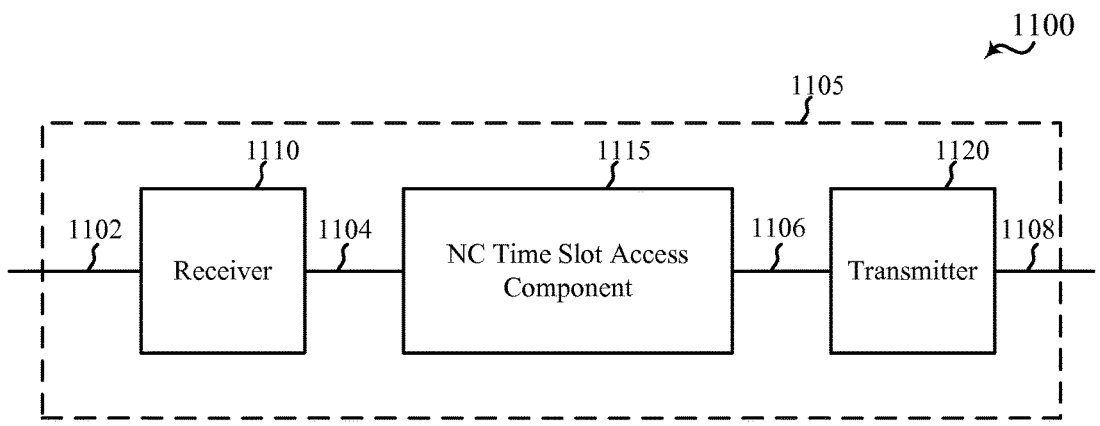
FIG. 11 shows a block diagram of an apparatus configured for communication in a wireless communication system according to various aspects of the present disclosure.

FIG. 11 shows a block diagram 1100 of an apparatus 1105 for wireless communication, in accordance with various aspects of the present disclosure. In some embodiments, the apparatus 1105 may be an example of aspects of the first nodes 205 described with reference to FIG. 2, 4, 6, or 7. In other embodiments, the apparatus 1105 may be an example of aspects of the AP 105 and/or the STAs 115 described with reference to FIG. 1. In further embodiments, the apparatus 1105 may be an example of aspects of the apparatus 805 described with reference to FIGS. 8, 9, and 10.

The apparatus 1105 may be an example of a first node 205 configured to signal soft TDM information for non-concurrent (NC) nodes to communicate in at least one NC time slot. The apparatus 1105 may also be a processor. The apparatus 1105 may include a receiver 1110, a NC time slot access component 1115, and/or a transmitter 1120. Each of these components may be in communication with each other via signals 1104 and 1106.

The components of the apparatus 1105 may, individually or collectively, be implemented using at least one ASIC adapted to perform some or all of the applicable functions in hardware. Alternatively, the functions may be performed by other processing units (or cores), on at least one integrated circuit. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors. In some embodiments, the components as shown in FIG. 11 each may include a circuit or circuitry for performing the functions described herein.

In some embodiments, the receiver 1110 may be or include an RF receiver such as a WLAN receiver. The receiver 1110 may also include other receivers, such as a Wi-Fi receiver and/or a WWAN receiver (e.g., a cellular receiver). The receiver 1110 may be used to receive various types of data and/or control signals (i.e., transmissions) over communication links 1102 (e.g., physical channels) of a wireless communication system such as the WLAN 100 described with reference to FIG. 1. For example, the receiver 1110 may be used to receive one or more messages exchanged during soft TDM signaling for NC nodes communicating in at least one NC time slot.

In some embodiments, the transmitter 1120 may be or include an RF transmitter such as a WLAN transmitter. The transmitter 1120 may also include other transmitters, such as a Wi-Fi transmitter and/or a WWAN transmitter (e.g., a cellular transmitter). The transmitter 1120 may be used to transmit various types of data and/or control signals (i.e., transmissions) over communication links 1108 (e.g., physical channels) of a wireless communication system such as the WLAN 100 described with reference to FIG. 1. For example, the transmitter 1120 may be used to transmit information associated soft TDM assignment signaling.

In some embodiments, the NC time slot access component 1115 may be an example of a component that manages the functions described with reference to FIG. 1, 2, 3, 4, 5, 6, or 7. In some examples, the NC time slot access component 1115 may be used to configure one or more soft TDM assignment fields sent to NC nodes to communicate during a NC first time slot. The NC time slot access component 1115 may be configured to identify primary nodes to communicate during the NC time slot and secondary nodes to communicate during the NC time slot. An assignment of a node as a primary node or a secondary node may be NC time slot dependent. The NC time slot access component 1115 may send connection information to the secondary nodes for the secondary nodes to communicate during the NC time slot. The NC time slot access component 1115 may send the connection information in a beacon signal. The NC time slot access component 1115 may communicate with the primary and/or secondary nodes via the receiver 1110 and/or the transmitter 1120.

Figure 12:
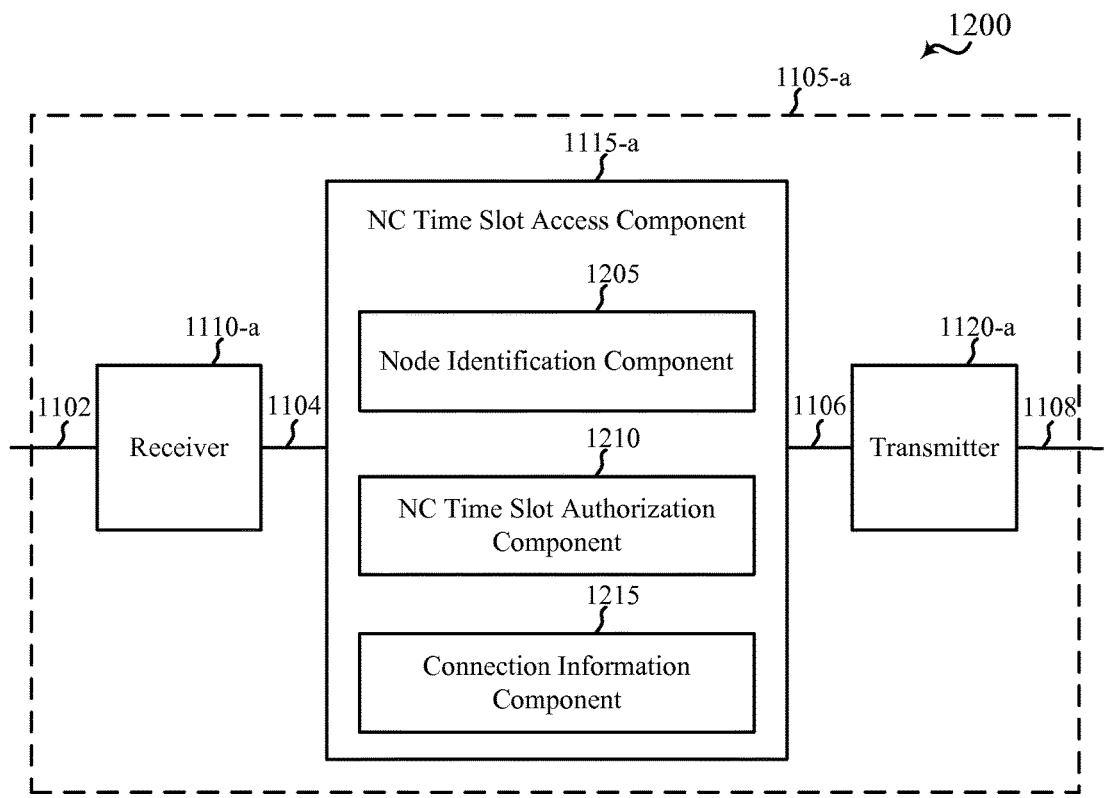
FIG. 12 shows a block diagram of an apparatus configured for communication in a wireless communication system according to various aspects of the present disclosure.

FIG. 12 shows a block diagram 1200 of an apparatus 1105-*a* for wireless communication, in accordance with various aspects of the present disclosure. In some embodiments, the apparatus 1105-*a* may be an example of aspects of the first nodes 205 described with reference to FIG. 2, 4, 6, or 7. In other embodiments, the apparatus 1105-*a* may be an example of aspects of the AP 105 and/or the STAs 115 described with reference to FIG. 1. In further embodiments, the apparatus 1105-*a* may be an example of aspects of the apparatus 805 described with reference to FIGS. 8, 9, and 10.

The apparatus 1105-*a* may be an example of a first node 205 configured to signal soft TDM information for non-concurrent (NC) nodes to communicate in at least one NC time slot. The apparatus 1105-*a* may also be a processor. The apparatus 1105-*a* may include a receiver 1110-*a*, a NC time slot access component 1115-*a*, and/or a transmitter 1120-*a*. Each of these components may be in communication with each other 1104 and 1106.

The components of the apparatus 1105-*a* may, individually or collectively, be implemented using at least one ASIC adapted to perform some or all of the applicable functions in hardware. Alternatively, the functions may be performed by other processing units (or cores), on at least one integrated circuit. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors. In some embodiments, the components as shown in FIG. 12 each may include a circuit or circuitry for performing the functions described herein.

In some embodiments, the receiver 1110-*a* may be or include an RF receiver such as a WLAN receiver. The receiver 1110-*a* may also include other receivers, such as a Wi-Fi receiver and/or a WWAN receiver (e.g., a cellular receiver). The receiver 1110-*a* may be used to receive various types of data and/or control signals (i.e., transmissions) over communication links 1102 (e.g., physical channels) of a wireless communication system such as the WLAN 100 described with reference to FIG. 1. For example, the receiver 1110-*a* may be used to receive one or more messages exchanged during soft TDM signaling for NC nodes communicating in a NC time slot.

In some embodiments, the transmitter 1120-*a* may be or include an RF transmitter such as a WLAN transmitter. The transmitter 1120-*a* may also include other transmitters, such as a Wi-Fi transmitter and/or a WWAN transmitter (e.g., a cellular transmitter). The transmitter 1120-*a* may be used to transmit various types of data and/or control signals (i.e., transmissions) over communication links 1108 (e.g., physical channels) of a wireless communication system such as the WLAN 100 described with reference to FIG. 1. For example, the transmitter 1120-*a* may be used to transmit information associated soft TDM assignment signaling.

In some embodiments, the NC time slot access component 1115-*a* may be an example of a component that manages the functions described with reference to FIG. 1, 2, 3, 4, 5, 6, or 7. The NC time slot access component 1115-*a* may include a node identification component 1205, a NC time slot authorization component 1210, and a connection information component 1215. The NC time slot access component 1115-*a* may be used to signal various soft TDM parameters for NC nodes, for example.

In some examples, the node identification component 1205 may be configured to identify primary and secondary nodes. The primary nodes may communicate during at least one NC time slot whereas the secondary nodes may also communicate during the at least one NC time slot. The node identification component 1205 may be configured to identify primary and secondary nodes according to the NC time slot. For example, the node identification component 1205 may identify and output information indicative of a group of nodes assigned to a primary node group for a first NC time slot and a second group of nodes assigned as the primary node group for a second NC time slot. As such, the nodes may be a primary node during at least one NC time slot to ensure traffic can be communicated in a priority fashion. The node identification may be output and included in connection information, e.g., a soft TDM assignment field.

In some examples, the NC time slot authorization component 1210 may be configured to identify NC time slots associated with EDCA operations and output information indicative of the NC time slots. The information associated with each NC time slot may include a start time and a duration field for the each NC time slot or a start time and an end time for the NC time slot. In some cases, the NC time slot authorization component 1210 may be configured to determine and output information indicative of a node for a first NC time slot and one or more subsequent NC time slots to communicate during using the connection information associated with the first non-concurrent time slot. The NC time slot authorization component 1210 may communicate with the node identification component 1205 to identify which nodes are primary nodes to communicate during a particular NC time slot and, when appropriate, which group of nodes are secondary nodes to communicate during the NC time slot.

In some examples, the connection information component 1215 may be configured to identify at least a portion of the connection information for NC operations on a per NC time slot basis. For example, the connection information component 1215 may identify and output information indicative of an enhanced distributed channel access configuration information, and an indicator field identifying whether the at least one access point permits secondary nodes to communicate during the NC time slot at the lower priority than the primary nodes. In some examples, the connection information component 1215 may also be configured to identify and output information indicative of connection information associated with the at least one access point and connection information associated with at least one neighbor access point. The connection information for the at least one access point and the at least one neighbor access point may include a NC time slot schedule for each access point, an enhanced distributed channel access configuration information for each access point, and an indicator field identifying whether each access point permits secondary nodes to communicate during the non-concurrent time slot at the lower priority than the primary node.

The NC time slot access component 1115-*a* may be configured to send a signal having connection information to secondary nodes for the secondary nodes to communicate during at least one NC time slot at a different priority than the primary nodes. In some examples, the secondary nodes may communicate during the at least one NC time slot at a lower priority than the primary nodes according to the connection information. In other examples, the secondary nodes may communicate during the at least one NC time slot at a higher priority than the primary nodes. The signal having the connection information may be sent to the secondary nodes in a beacon signal, a probe request message, a probe response message, an association request message, or an association response message. The signal may be sent via the transmitter 1220-*a*, for example.

Figure 13:
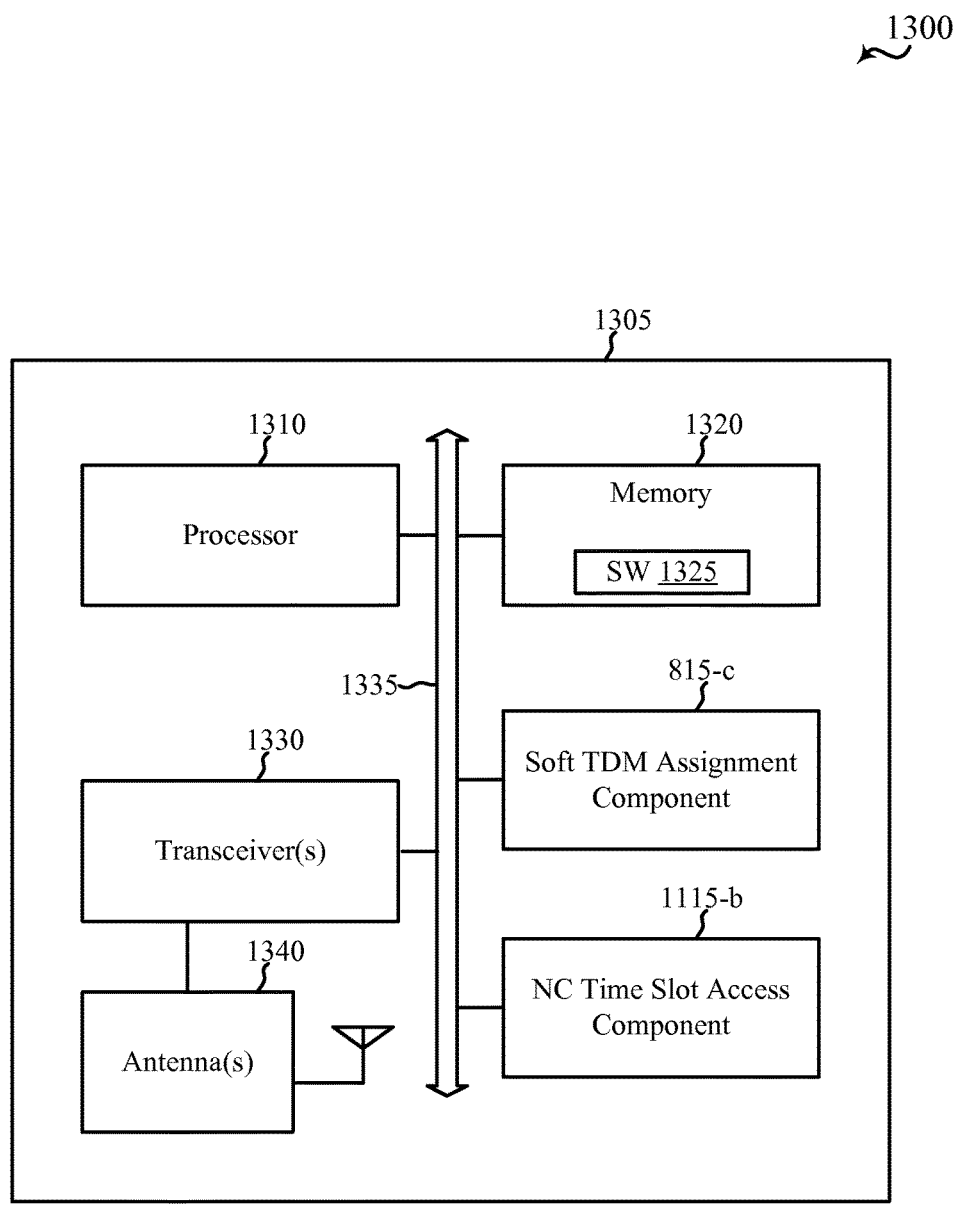
FIG. 13 shows a block diagram of a device configured for communication in a wireless communication system according to various aspects of the present disclosure.

FIG. 13 shows a block diagram 1300 of a wireless device 1305 configured for wireless communication, in accordance with various aspects of the present disclosure. The wireless device 1305 may have various configurations and may be or be part of a computer (e.g., a laptop computer, netbook computer, tablet computer, etc.), a cellular telephone, a personal digital assistant (PDA), a digital video recorder (DVR), an internet appliance, a gaming console, an e-reader, etc. The wireless device 1305 may in some cases have an internal power supply (not shown), such as a small battery, to facilitate mobile operation. In some embodiments, the wireless device 1305 may be an example of aspects of the first nodes 205 described with reference to FIG. 2, 4, 6, or 7. In other embodiments, the wireless device 1305 may be an example of aspects of the AP 105 and/or the STAs 115 described with reference to FIG. 1. In further embodiments, the wireless device 1305 may be an example of aspects of the apparatus 805 described with reference to FIGS. 8, 9, and 10. The wireless device 1305 may be configured to implement at least some of the features and functions described with reference to FIG. 1, 2, 3, 4, 5, 6, or 7. The wireless device 1305 may be configured to communicate with the second and the third nodes 115 described with reference to FIG. 2, 4, 6, or 7.

The wireless device 1305 may include a processor 1310, a memory 1320 (including software code (SW) 1325), at least one transceiver (represented by transceiver(s) 1330), at least one antenna (represented by antenna(s) 1340), a soft TDM assignment component 815-*c*, and/or a NC time slot access component 1115-*b*. Each of these components may be in communication with each other, directly or indirectly, over at least one bus 1335.

The transceiver(s) 1330, in conjunction with antenna(s) 1340, may facilitate wireless communication with nodes, access points, wireless stations, and/or other apparatuses. Wireless communication with a node, as described above, may be managed using the soft TDM assignment component 815-*c* and/or the NC time slot access component 1115-*b*.

The processor 1310 may include an intelligent hardware device, e.g., a central processing unit (CPU), a microcontroller, an ASIC, etc. The processor 1310 may process information received through the transceiver(s) 1330 and/or process information to be sent to the transceiver(s) 1330 for transmission through the antenna(s) 1340. The processor 1310 may handle, alone or in connection with the soft TDM assignment component 815-*c* and/or the NC time slot access component 1115-*b*, various aspects of communicating over a wireless and/or wireline communication system.

The memory 1320 may include random access memory (RAM) and/or read-only memory (ROM). The memory 1320 may store computer-readable, computer-executable software (SW) code 1325 containing instructions that are configured to, when executed, cause the processor 1310 to perform various functions described herein for communicating over a wireless communication system. Alternatively, the software code (SW) 1325 may not be directly executable by the processor 1310 but be configured to cause the wireless device 1305 (e.g., when compiled and executed) to perform various of the functions described herein.

The soft TDM assignment component 815-*c* may be an example of aspects of the soft TDM assignment components 815 described with reference to FIG. 8, 9, or 10. The soft TDM assignment component 815-*c* may be used to configure one or more soft TDM assignment fields sent to a first group of nodes to communicate during at least one time slot. At least one of the soft TDM assignment fields may convey connection information to the first group of nodes for the first group of nodes to communicate during the at least one time slot. In some embodiments, the soft TDM assignment component 815-*c*, or portions of same, may include a processor, and/or some or all of the functionality of the soft TDM assignment component 815-*c* may be performed by the processor 1310 and/or in connection with the processor 1310.

The NC time slot access component 1115-*b* may be an example of aspects of the NC time slot access components 1115 described with reference to FIG. 11 or 12. The NC time slot access component 1115-*b* may be used to configure one or more soft TDM assignment fields sent to NC nodes to communicate during at least one NC time slot. The NC time slot access component 1115-*b* may be configured to identify primary nodes that to communicate during the at least one NC time slot and secondary nodes to also communicate during the at least one NC time slot. An assignment of a node as a primary node or a secondary node may be NC time slot dependent. The NC time slot access component 1115-*b* may send connection information to the secondary nodes for the secondary nodes to communicate during the at least one NC time slot. The NC time slot access component 1115-*b* may send the connection information in a beacon signal. In some embodiments, the NC time slot access component 1115-*b*, or portions of same, may include a processor, and/or some or all of the functionality of the NC time slot access component 1115-*b* may be performed by the processor 1310 and/or in connection with the processor 1310.

Figure 14:
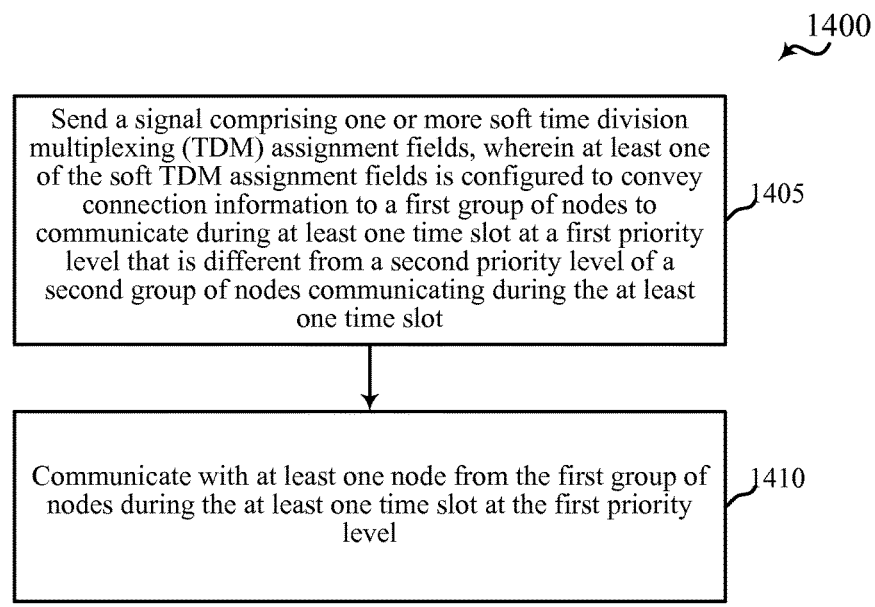
FIGS. 14-17 show flowcharts illustrating examples of methods for wireless communications according to various aspects of the present disclosure.

FIG. 14 shows a flowchart illustrating an example of a method 1400 for wireless communications according to at least one aspect of the principles described above. The method 1400 may be implemented by at least one of the STAs 115, the AP 105 described above with reference to FIG. 1, the first nodes 205 described above with reference to FIG. 2, 4, 6, or 7, the apparatuses 805 or 1105 of FIG. 8, 9, 10, or 11, and/or the wireless device 1305 described above with reference to FIG. 12. In some examples, a node such as one of the STAs 115, a AP 105, an apparatus such as apparatus 805 or 1105, or a wireless device 1305 may execute sets of codes to control the functional elements of the STA, AP, node, apparatus, or device to perform the functions described below.

At block 1405, the method 1400 may send a signal comprising one or more soft time division multiplexing (TDM) assignment fields to a first group of nodes, wherein at least one of the soft TDM assignment fields is configured to convey connection information to the first group of nodes to communicate during at least one time slot at a first priority level that is different from a second priority level of a second group of nodes communicating during the at least one time slot. For example, the signal may be sent at 215-210, 415-420, 615-620, as described above with reference to FIG. 2, 4, or 6, respectively.

At block 1410, the method 1400 may communicate with at least one node from the first group of nodes during the at least one time slot at the first priority level. For example, the communication may be performed at 225, 425, 630, as described above with reference to FIG. 2, 4, or 6, respectively.

In some embodiments, the operations at block 1405 or 1410 may be performed using the soft TDM assignment component 815 described with reference to FIG. 8, 9, 10 or 13. Nevertheless, it should be noted that the method 1400 is just one implementation and that the operations of the method 1400 may be rearranged or otherwise modified such that other implementations are possible.

Figure 15:
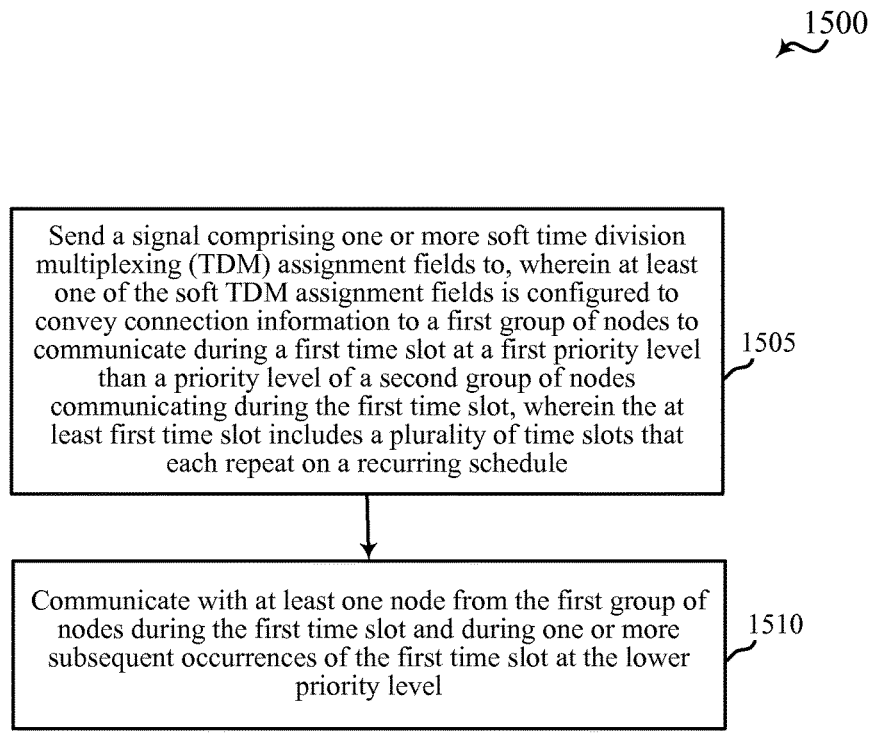

FIG. 15 shows a flowchart illustrating an example of a method 1500 for wireless communications according to at least one aspect of the principles described above. The method 1500 may be implemented by at least one of the STAs 115, the AP 105 described above with reference to FIG. 1, the first nodes 205 described above with reference to FIG. 2, 4, 6, or 7, the apparatuses 805 or 1105 of FIG. 8, 9, 10, or 11, and/or the wireless device 1305 described above with reference to FIG. 12. In some examples, a node such as one of the STAs 115, a AP 105, an apparatus such as apparatus 805 or 1105, or a wireless device 1305 may execute sets of codes to control the functional elements of the STA, AP, node, apparatus, or device to perform the functions described below.

At block 1505, the method 1500 may send a signal comprising one or more soft TDM assignment fields to a first group of nodes, wherein at least one of the soft TDM assignment fields is configured to convey connection information to the first group of nodes to communicate during a first time slot at a priority level lower than a priority level of a second group of nodes communicating during the first time slot, wherein the at least first time slot may include a plurality of time slots that each repeat on a recurring schedule. For example, the signal may be sent at 215-210, 415-420, 615-620, as described above with reference to FIG. 2, 4, or 6, respectively. The at least one of the soft TDM assignment fields may comprise periodicity information, and the at least one of the soft TDM assignment field may convey to at least one group of a group of nodes the first time slot and one or more subsequent time slots for communication using the connection information associated with the first time slot. For example, the soft TDM assignment may convey the first time slot and one or more subsequent time slots at 225, 425, 630, as described above with reference to FIG. 2, 4, or 6, respectively.

At block 1510, the method 1500 may communicate with at least one node from the first group of nodes during the first time slot and during one or more subsequent occurrences of the first time slot, at the lower priority level. For example, the communication may be performed at 225, 425, 630, as described above with reference to FIG. 2, 4, or 6, respectively.

In some embodiments, the operations at block 1505 or 1510 may be performed using the soft TDM assignment component 815 described with reference to FIG. 8, 9, 10, or 13. Nevertheless, it should be noted that the method 1500 is just one implementation and that the operations of the method 1500 may be rearranged or otherwise modified such that other implementations are possible.

Figure 16:
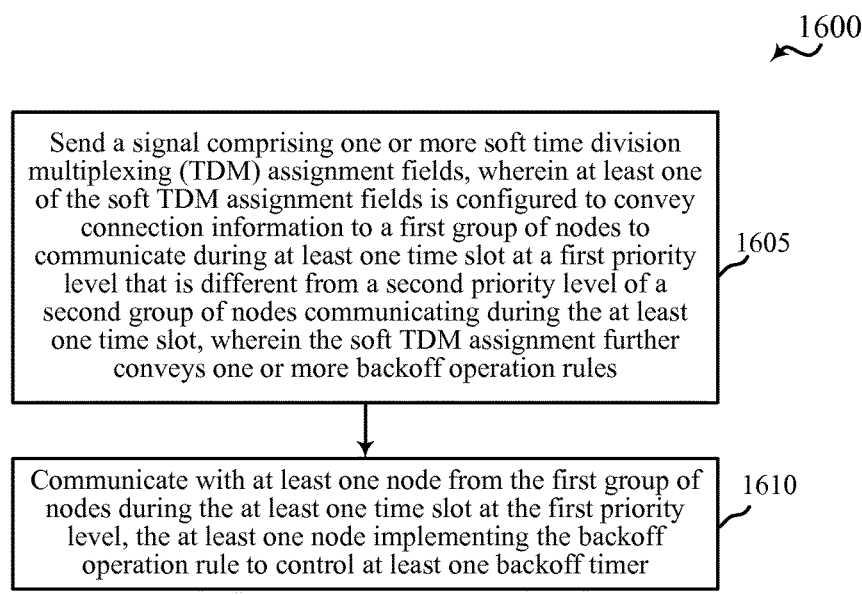

FIG. 16 shows a flowchart illustrating an example of a method 1600 for wireless communications according to at least one aspect of the principles described above. The method 1600 may be implemented by at least one of the STAs 115, the AP 105 described above with reference to FIG. 1, the first nodes 205 described above with reference to FIG. 2, 4, 6, or 7, the apparatuses 805 or 1105 of FIG. 8, 9, 10, or 11, and/or the wireless device 1305 described above with reference to FIG. 12. In some examples, a node such as one of the STAs 115, a AP 105, an apparatus such as apparatus 805 or 1105, or a wireless device 1305 may execute sets of codes to control the functional elements of the STA, AP, node, apparatus, or device to perform the functions described below.

At block 1605, the method 1600 may send a signal comprising one or more soft TDM assignment fields to a first group of nodes, wherein at least one of the soft TDM assignment fields is configured to convey connection information to the first group of nodes to communicate during at least one time slot at a first priority level that is different from a second priority level of a second group of nodes communicating during the at least one time slot, wherein the soft TDM assignment further conveys one or more backoff operation rules. For example, the signal may be sent at 215-210, 415-420, 615-620, as described above with reference to FIG. 2, 4, or 6, respectively.

At block 1610, the method 1600 may communicate with at least one node from the first group of nodes during the at least one time slot at the first priority, the at least one node implementing the backoff operation rule to control at least one backoff timer. For example, the communication may be performed at 225, 425, 630, as described above with reference to FIG. 2, 4, or 6, respectively. For example, the backoff time control may be performed at 625 or 635, as described above with reference to FIG. 6.

In some embodiments, the operations at block 1605 or 1610 may be performed using the soft TDM assignment component 815 described with reference to FIG. 8, 9 10, or 13. Nevertheless, it should be noted that the method 1600 is just one implementation and that the operations of the method 1600 may be rearranged or otherwise modified such that other implementations are possible.

Figure 17:
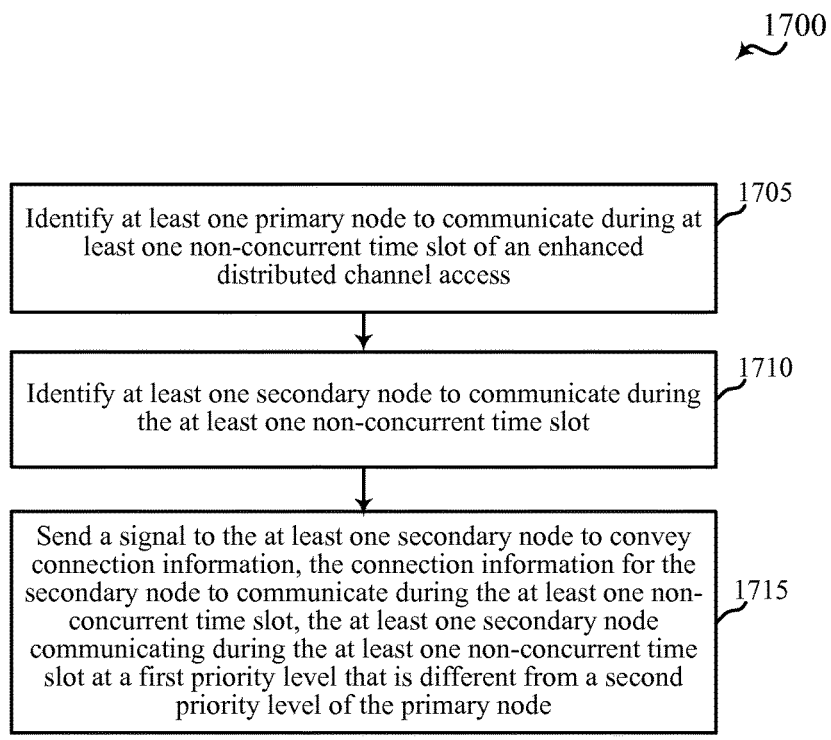

FIG. 17 shows a flowchart illustrating an example of a method 1700 for wireless communications according to at least one aspect of the principles described above. The method 1700 may be implemented by at least one of the STAs 115, the AP 105 described above with reference to FIG. 1, the first nodes 205 described above with reference to FIG. 2, 4, 6, or 7, the apparatuses 805 or 1105 of FIG. 8, 9, 10, or 11, and/or the wireless device 1305 described above with reference to FIG. 12. In some examples, a node such as one of the STAs 115, a AP 105, an apparatus such as apparatus 805 or 1105, or a wireless device 1305 may execute sets of codes to control the functional elements of the STA, AP, node, apparatus, or device to perform the functions described below.

At block 1705, the method 1700 may identify at least one primary node to communicate during at least one non-concurrent time slot of an enhanced distributed channel access. For example, the primary node may be identified at 705, as described above with reference to FIG. 7.

At block 1710, the method 1700 may identify at least one secondary node to communicate during the at least one non-concurrent time slot. For example, the secondary node may be identified at 710, as described above with reference to FIG. 7.

At block 1715, the method 1700 may send a signal to the at least one secondary node to convey connection information, the connection information for the secondary node to communicate during the at least one non-concurrent time slot, the secondary node communicating during the at least one non-concurrent time slot at a first priority level that is different from a second priority level of the primary node. For example, the signal may be sent at 715 or 720, as described above with reference to FIG. 7.

In some embodiments, the operations at block 1705, 1710, or 1715 may be performed using the NC time slot access component 1115 described with reference to FIG. 11, 12 or 13. Nevertheless, it should be noted that the method 1700 is just one implementation and that the operations of the method 1700 may be rearranged or otherwise modified such that other implementations are possible.

The detailed description set forth above in connection with the appended drawings describes exemplary embodiments and does not represent the only embodiments that may be implemented or that are within the scope of the claims. The term "example" or "exemplary," when used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In embodiments, the components as shown in FIGS. 8, 9, 10, 11, 12, and 13, each may include a circuit or circuitry for performing the functions described herein with reference to FIGS. 8, 9, 10, 11, 12, and 13.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disc (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
sending a signal comprising one or more soft time division multiplexing (TDM) assignment fields and at least one backoff operations rule, wherein at least one of the soft TDM assignment fields is configured to convey connection information to a first group of nodes to communicate during at least one time slot at a first priority level that is different from a second priority level of a second group of nodes communicating during the at least one time slot, and wherein the at least one backoff operations rule indicates to each of at least one node in the first group of nodes and at least one node in the second group of nodes to update a corresponding backoff timer based at least in part on the connection information in the at least one of the soft TDM assignment fields; and
communicating with the at least one node from the first group of nodes during the at least one time slot at the first priority level.

2. The method of claim 1, wherein the connection information comprises one or more of identification data for each group of nodes communicating during the at least one time slot, a set of enhanced distributed channel access parameters for at least one of the first group of nodes and the second group of nodes communicating during the at least one time slot, and a time slot parameter identifying the at least one time slot.

3. The method of claim 2, wherein the identification data comprises at least one of an identification code associated with one or more nodes in one or more groups of nodes, a range of identification codes associated with one or more nodes in one or more groups of nodes, and an index of predefined identification codes for one or more groups of nodes.

4. The method of claim 2, wherein the set of enhanced distributed channel access parameters comprises one or more of a minimum contention window size, a maximum contention window size, an arbitration inter-frame space number, and a transmit opportunity for each group of nodes.

5. The method of claim 2, wherein the time slot parameter comprises a start time and a duration field for the at least one time slot or a start time and an end time for the at least one time slot.

6. The method of claim 2, wherein the at least one of the soft TDM assignment fields comprises one or more of information identifying operating channels of an enhanced distributed channel access, default enhanced distributed channel access parameters to be used by unspecified nodes during the at least one time slot, enhanced distributed channel access parameters to be used per group of nodes during a second time slot that is different from the at least one time slot, and default enhanced distributed channel access parameters to be used by nodes outside of any specified time slot.

7. The method of claim 1, wherein the at least one of the soft TDM assignment fields is sent in at least one of a beacon, a probe request message, a probe response message, an association request message, or an association response message.

8. The method of claim 1, wherein the at least one time slot comprises a plurality of time slots that each repeat on a recurring schedule and the at least one of the soft TDM assignment fields comprises periodicity information.

9. The method of claim 8, wherein the at least one of the soft TDM assignment fields conveys the connection information associated with each time slot in every period to at least one of a plurality of groups of nodes scheduled to communicate during that time slot in every period.

10. The method of claim 8, wherein the signal comprises a common enhanced distributed channel access parameters for a primary group of nodes and a secondary group of nodes to use during each time slot in every period.

11. The method of claim 10, wherein each soft TDM assignment field identifies nodes to use the common enhanced distributed channel access parameters as the primary group of nodes and nodes to use the common enhanced distributed channel access parameters as the secondary group of nodes.

12. The method of claim 1, wherein the backoff timers are associated with backoff operations performed at a boundary of the at least one time slot.

13. The method of claim 1, wherein the signal comprising the at least one backoff operations rule further indicates to the at least one node in each of the first and second groups of nodes to:

reset the corresponding backoff timer at the beginning of at least the at least one time slot.

14. The method of claim 1, wherein the at least one node in the first group of nodes comprises a plurality of backoff timers associated with backoff operations performed at a boundary of a time slot during which the at least one node is communicating, each backoff timer associated with a particular time slot in a recurring schedule.

15. The method of claim 14, wherein the signal comprising the at least one backoff operations rule further indicates to the at least one node in the first group of nodes to:
pause the associated backoff timer at the end of each time slot in the recurring schedule during which the at least one node is communicating; and
restart the associated backoff timer at the beginning of a next subsequently occurring time slot in the recurring schedule during which the at least one node is communicating.

16. The method of claim 1, wherein the at least one node in the first group of nodes comprises a primary backoff timer associated with backoff operations performed at a boundary of a primary time slot during which the at least one node is communicating and a secondary backoff timer associated with backoff operations performed at a boundary of a secondary time slot during which the at least one node is communicating.

17. The method of claim 16, wherein the signal comprising the at least one backoff operations rule further indicates to the at least one node in the first group of nodes to:
pause the primary backoff timer at the end of a primary time slot during which the at least one node is communicating; and
restart the primary backoff timer at the beginning of a next subsequently occurring primary time slot during which the at least one node is communicating.

18. The method of claim 16, wherein the signal comprising the at least one backoff operations rule further indicates to the at least one node in the first group of nodes to:
reset the secondary backoff timer at the beginning of each recurring secondary time slot during which the at least one node is communicating.

19. An apparatus for wireless communication, comprising:
a soft time division multiplexing (TDM) assignment component configured to send a signal comprising one or more soft TDM assignment fields and at least one backoff operations rule, wherein at least one of the soft TDM assignment fields is configured to convey connection information to a first group of nodes to communicate during at least one time slot at a first priority level that is different from a second priority level of a second group of nodes communicating during the at least one time slot, and wherein the at least one backoff operations rule indicates to each of at least one node in the first group of nodes and at least one node in the second group of nodes to update a corresponding backoff timer based at least in part on the connection information in the at least one of the soft TDM assignment fields; and
the soft TDM assignment component further configured to communicate with the at least one node from the first group of nodes during the at least one time slot at the first priority level.

20. The apparatus of claim 19, wherein the connection information comprises one or more of identification data for each group of nodes communicating during the at least one time slot, a set of enhanced distributed channel access parameters for at least one of the first group of nodes and the second group of nodes communicating during the at least one time slot, and a time slot parameter identifying the at least one time slot.

21. The apparatus of claim 20, wherein the identification data comprises at least one of an identification code associated with one or more nodes in one or more groups of nodes, a range of identification codes associated with one or more nodes in one or more groups of nodes, and an index of predefined identification codes for one or more groups of nodes.

22. The apparatus of claim 20, wherein the set of enhanced distributed channel access parameters comprise one or more of a minimum contention window size, a maximum contention window size, an arbitration interframe space number, and a transmit opportunity for each group of nodes.

23. The apparatus of claim 20, wherein the time slot parameter comprises a start time and a duration field for the at least one time slot or a start time and an end time for the at least one time slot.

24. The apparatus of claim 20, wherein the at least one of the soft TDM assignment fields comprises one or more of information identifying operating channels of an enhanced distributed channel access, default enhanced distributed channel access parameters to be used by unspecified nodes during the at least one time slot, enhanced distributed channel access parameters to be used per group of nodes during a second time slot that is different from the at least one time slot, and default enhanced distributed channel access parameters to be used by nodes outside of any specified time slot.

25. The apparatus of claim 19, wherein the at least one of the soft TDM assignment fields is sent in at least one of a beacon, a probe request message, a probe response message, an association request message, or an association response message.

26. The apparatus of claim 19, wherein the at least one time slot comprises a plurality of time slots that each repeat on a recurring schedule and the at least one of the soft TDM assignment fields comprises periodicity information.

27. The apparatus of claim 26, wherein the at least one of the soft TDM assignment fields conveys the connection information associated with each time slot in every period to at least one of a plurality of groups of nodes scheduled to communicate during that time slot in every period.

28. The apparatus of claim 26, wherein the signal comprises a common enhanced distributed channel access parameters for a primary group of nodes and a secondary group of nodes to use during each time slot in every period.

29. The apparatus of claim 28, wherein each soft TDM assignment field identifies nodes to use the common enhanced distributed channel access parameters as the primary group of nodes and nodes to use the common enhanced distributed channel access parameters as the secondary group of nodes.

30. An apparatus for wireless communication, comprising:
at least one processor;
a memory in electronic communication with the at least one processor; and
instructions stored in the memory, the instructions being executable by the at least one processor to:
send a signal comprising one or more soft TDM assignment fields and at least one backoff operations rule, wherein at least one of the soft TDM assignment fields is configured to convey connection information to a first group of nodes to communicate during at least one time slot at a first priority level that is different from a second priority level of a second group of nodes communicating during the at least one time slot, and wherein the at least one backoff operations rule indicates to each of at least one node in the first group of nodes and at least one node in the second group of nodes to update a corresponding backoff timer based at least in part on the connection information in the at least one of the soft TDM assignment fields; and
communicate with the at least one node from the first group of nodes during the at least one time slot at the first priority level.

31. A method for wireless communication, comprising:
identifying at least one primary node to communicate during at least one non-concurrent time slot of an enhanced distributed channel access;
identifying at least one secondary node to communicate during the at least one non-concurrent time slot; and
sending a signal to the at least one secondary node to convey connection information, the connection information for the at least one secondary node to communicate during the at least one non-concurrent time slot, the at least one secondary node communicating during the at least one non-concurrent time slot at a first priority level that is different from a second priority level of the at least one primary node, the signal indicating to the at least one secondary node to reduce a carrier clearance assessment energy detection threshold in relation to a carrier clearance assessment energy detection threshold for the at least one primary node.

32. The method of claim 31, wherein the connection information is conveyed in a beacon sent from an access point, further comprising:
communicating with the at least one secondary node based upon the at least one secondary node receiving the beacon from the access point.

33. The method of claim 31, further comprising:
broadcasting, by at least one access point operating on the enhanced distributed channel access, connection information comprising a non-concurrent time slot schedule, an enhanced distributed channel access configuration information, and an indicator field identifying whether the at least one access point permits secondary nodes to communicate during the at least one non-concurrent time slot at the first priority level.

34. The method of claim 31, further comprising:
broadcasting, by at least one access point operating on the enhanced distributed channel access, connection information associated with the at least one access point and connection information associated with at least one neighbor access point.

35. The method of claim 34, wherein the connection information for the at least one access point and the at least one neighbor access point comprises a non-concurrent time slot schedule for each access point, an enhanced distributed channel access configuration information for each access point, and an indicator field identifying whether each access point permits secondary nodes to communicate during the at least one non-concurrent time slot at the first priority level.

36. The method of claim 31, wherein the connection information comprises a soft time division multiplexing (TDM) assignment field for the at least one non-concurrent time slot.

37. The method of claim 36, wherein the soft TDM assignment field further comprises one or more of an indicator field identifying whether an access point permits secondary nodes to communicate during the at least one non-concurrent time slot at the first priority level, enhanced distributed channel access configuration information for the at least one primary node, and enhanced distributed channel access configuration information for the at least one secondary node.

38. The method of claim 37, wherein the soft TDM assignment field further comprises one or more of identification data identifying the at least one primary node and the at least one secondary node.

39. The method of claim 38, wherein the identification data comprises at least one of an identification code associated with one or more nodes in one or more groups of nodes, a range of identification codes associated with one or more nodes in one or more groups of nodes, and an index of predefined identification codes for one or more groups of nodes.

40. The method of claim 36, wherein the at least one non-concurrent time slot is repeated on a recurring schedule and the soft TDM assignment field comprises periodicity information.

41. The method of claim 40, wherein the soft TDM assignment field conveys to at least one node a first non-concurrent time slot and one or more subsequent non-concurrent time slots to communicate during using the connection information associated with the first non-concurrent time slot.

42. The method of claim 31, wherein the at least one secondary node communicating during the at least one non-concurrent time slot at the first priority level that is different from the second priority level of the at least one primary node uses reduced enhanced distributed channel access parameters by the at least one secondary node with respect to enhanced distributed channel access parameters used by the at least one primary node.

43. The method of claim 42, wherein the reduced enhanced distributed channel access parameters used by the at least one secondary node comprise, with respect to the enhanced distributed channel access parameters used by the at least one primary node, one or more of a larger minimum contention window size, a larger maximum contention window size, a larger arbitration inter-frame space number, and a shorter transmit opportunity.

44. The method of claim 31, wherein the at least one secondary node receives from an access point operating on the enhanced distributed channel access, a signal indicating that the access point has no information to communicate during the at least one non-concurrent time slot and communicates during the at least one non-concurrent time slot based on receiving the signal.

45. The method of claim 31, wherein the at least one secondary node determines that an access point operating on the enhanced distributed channel access is not communicating with any of primary nodes for a predetermined time threshold during the at least one non-concurrent time slot and communicates during the at least one non-concurrent time slot based on the determination.

46. An apparatus for wireless communication, comprising:
 a non-concurrent time slot access component configured to:
  identify at least one primary node to communicate during at least one non-concurrent time slot of an enhanced distributed channel access; and
  identify at least one secondary node to communicate during the at least one non-concurrent time slot, and
 a transmitter configured to send a signal to the at least one secondary node to convey connection information, the connection information for the at least one secondary node to communicate during the at least one non-concurrent time slot, the at least one secondary node communicating during the at least one non-concurrent time slot at a first priority level that is different from a second priority level of the at least one primary node, the signal indicating to the at least one secondary node to reduce a carrier clearance assessment energy detection threshold in relation to a carrier clearance assessment energy detection threshold for the at least one primary node.

47. The apparatus of claim 46, wherein the connection information is conveyed in a beacon sent from an access point, the non-concurrent time slot access component further configured to:
 communicate with the at least one secondary node based upon the at least one secondary node receiving the beacon from the access point.

48. The apparatus of claim 46, the non-concurrent time slot access component further configured to:
 broadcast, by at least one access point operating on the enhanced distributed channel access, connection information comprising a non-concurrent time slot schedule, an enhanced distributed channel access configuration information, and an indicator field identifying whether the at least one access point permits secondary nodes to communicate during the at least one non-concurrent time slot at the first priority level.

49. An apparatus for wireless communication, comprising:
 at least one processor;
 a memory in electronic communications with the at least one processor; and
 instructions stored in the memory, the instructions being executable by the at least one processor to:
  identify at least one primary node to communicate during at least one non-concurrent time slot of an enhanced distributed channel access;
  identify at least one secondary node to communicate during the at least one non-concurrent time slot; and
  send a signal to the at least one secondary node to convey connection information, the connection information for the at least one secondary node to communicate during the at least one non-concurrent time slot, the at least one secondary node communicating during the at least one non-concurrent time slot at a first priority level that is different from a second priority level of the at least one primary node, the signal indicating to the at least one secondary node to reduce a carrier clearance assessment energy detection threshold in relation to a carrier clearance assessment energy detection threshold for the at least one primary node.

* * * * *